(12) United States Patent
Tamura et al.

(10) Patent No.: US 9,591,545 B2
(45) Date of Patent: Mar. 7, 2017

(54) HANDOVER CONTROL METHOD, WIRELESS COMMUNICATION TERMINAL, AND WIRELESS COMMUNICATION DEVICE

(75) Inventors: Takashi Tamura, Kanagawa (JP); Hidenori Matsuo, Kanagawa (JP); Akihiko Nishio, Osaka (JP); Daichi Imamura, Beijing (CN)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 195 days.

(21) Appl. No.: 14/131,873

(22) PCT Filed: Jul. 31, 2012

(86) PCT No.: PCT/JP2012/004874
§ 371 (c)(1),
(2), (4) Date: Jan. 9, 2014

(87) PCT Pub. No.: WO2013/024574
PCT Pub. Date: Feb. 21, 2013

(65) Prior Publication Data
US 2014/0126545 A1 May 8, 2014

(30) Foreign Application Priority Data
Aug. 12, 2011 (JP) ................ 2011-176975

(51) Int. Cl.
*H04W 36/00* (2009.01)
*H04W 36/30* (2009.01)
(Continued)

(52) U.S. Cl.
CPC ....... *H04W 36/30* (2013.01); *H04W 36/0016* (2013.01); *H04W 36/38* (2013.01); *H04W 36/04* (2013.01)

(58) Field of Classification Search
None
See application file for complete search history.

(56) References Cited

U.S. PATENT DOCUMENTS

2009/0291689 A1 11/2009 Negishi et al.
2010/0124172 A1* 5/2010 Tenny et al. ............ 370/242
(Continued)

FOREIGN PATENT DOCUMENTS

EP 2453694 A1 5/2012
JP 2010-004522 A 1/2010
(Continued)

OTHER PUBLICATIONS

3GPP TR36.814 v9.0.0, "Evolved Universal Terrestrial Radio Access (E-UTRA); Further advancements for E-UTRA physical layer aspects", Mar. 2010.
(Continued)

*Primary Examiner* — Yaotang Wang
(74) *Attorney, Agent, or Firm* — Pearne & Gordon LLP

(57) ABSTRACT

Under a handover control method, a wireless communication terminal receives a conditional handover command that is transmitted from a wireless communication device which provides an own cell connected to the wireless communication terminal and that gives a command to start handover to an adjacent cell when a predetermined condition is satisfied; determines whether or not the predetermined condition is satisfied; and starts handover to the adjacent cell indicated by the conditional handover command when the predetermined condition is satisfied.

27 Claims, 19 Drawing Sheets

(51) Int. Cl.
H04W 36/38 (2009.01)
H04W 36/04 (2009.01)

(56) References Cited

U.S. PATENT DOCUMENTS

| | | | |
|---|---|---|---|
| 2010/0215023 A1* | 8/2010 | Hoole | 370/332 |
| 2010/0322118 A1* | 12/2010 | Fang et al. | 370/280 |
| 2012/0057500 A1* | 3/2012 | Nakayama | H04W 24/08 370/252 |
| 2012/0282931 A1* | 11/2012 | Giustina et al. | 455/437 |
| 2014/0141792 A1* | 5/2014 | Larsson et al. | 455/452.1 |

FOREIGN PATENT DOCUMENTS

| | | | |
|---|---|---|---|
| JP | WO 2010131688 A1 * | 11/2010 | H04W 24/08 |
| JP | 2011-019074 A | 1/2011 | |
| JP | 2011-130355 A | 6/2011 | |
| JP | 2011-254466 A | 12/2011 | |
| WO | 2011/040041 A1 | 4/2011 | |

OTHER PUBLICATIONS

3GPP TS36.331 v10.2.0, "Evolved Universal Terrestrial Radio Access (E-UTRA); Radio Resource Control (RRC)", Jul. 2011.
3GPP TS36211 v10.1.0, "Evolved Universal Terrestrial Radio Access (E-UTRA); Physical Channels and Modulation", Mar. 2011.
International Search Report for Application No. PCT/JP2012/004874 dated Sep. 4, 2012.

* cited by examiner

HANDOVER CONTROL METHOD, WIRELESS COMMUNICATION TERMINAL, AND WIRELESS COMMUNICATION DEVICE

TECHNICAL FIELD

The disclosure relates to a handover control method under which a wireless communication terminal carries out a communication with one or a plurality of wireless communication devices by use of a control channel and a data channel, a wireless communication terminal, and a wireless communication device.

BACKGROUND ART

The standard setting organization 3GPP (The $3^{rd}$ Generation Partnership Project) is now going ahead with standardization of LTE-Advanced (Long Term Evolution Advanced: LTE-A) as a next generation communication standard that is compatible with an LTE (Long Term Evolution) standard. According to the LTE standard, a wireless communication device (hereinafter also called an "NE (Network Entity)" of a network (Evolved Universal Terrestrial Radio Access Network: E-UTRAN) provides one communication cell or more.

The wireless communication device is a device that serves as an access point for a wireless communication terminal (User Equipment: UE), like a wireless communication base station (E-UTRAN NodeB: eNB), an remote base station (Remote Radio Head: RRH), and a relay (Relay Node (NR) or a repeater). The wireless communication terminal belongs to one of communication cells provided by the wireless communication device. When a plurality of frequencies are used, the wireless communication terminal belongs to one communication cell at one frequency. The communication cell is hereunder simply called a "cell," and the wireless communication terminal is simply called a "terminal."

The LTE standard employs a handover (hereinafter also abbreviated as "HO") technique of switching a cell to which the terminal is to be connected from a cell (a Serving Cell which will be hereunder called an "own cell") to which the terminal in a connected state is connected to an adjacent cell when there is an adjacent cell whose reception environment is superior to a reception environment of the own cell. In this regard, the adjacent cell designates an arbitrary cell among all cells except for the own cell connected to the terminal. Even in a case of a cell not connected to the terminal, the cell can be included in or exempted from a category of adjacent cell when the terminal is used for receiving a communication by way of a physical downlink shared channel (PDSCH).

CITATION LIST

Non Patent Literature

NPL 1: 3GPP TS36.814 v9.0.0, "Evolved Universal Terrestrial Radio Access (E-UTRA); Further advancements for E-UTRA physical layer aspects"
NPL 2: 3GPP TS36.331 v10.2.0, "Evolved Universal Terrestrial Radio Access (E-UTRA) Radio Resource Control (RRC)"
NPL 3: 3GPP TS36.211 v10.1.0, "Evolved Universal Terrestrial Radio Access (E-UTRA) Physical Channels and Modulation"

SUMMARY OF INVENTION

Technical Problem

An objective of the disclosure is to provide a handover control method, a wireless communication terminal, and a wireless communication device which enable performance of handover to an adjacent cell in an appropriate circumstance during movement of a wireless communication terminal even when signal reception quality of a data channel of the own cell connected to the wireless communication terminal differs from signal reception quality of a control channel of the own cell.

Solution to Problem

This disclosure provides a handover control method that is carried out by a wireless communication terminal which performs a communication with a wireless communication device by use of a control channel and a data channel, the method including: receiving a conditional handover command that has been transmitted from the wireless communication device which provides an own cell connected to the wireless communication terminal and that gives a command to start handover to an adjacent cell when a predetermined condition is satisfied; determining whether or not the predetermined condition is satisfied; and starting handover to the adjacent cell indicated by the conditional handover command when the predetermined condition is satisfied.

This disclosure provides a wireless communication terminal that performs a communication with a wireless communication device by use of a control channel and a data channel, the terminal including: a receiving section that receives a conditional handover command transmitted from a wireless communication device which provides an own cell connected to the wireless communication terminal and that gives a command to start handover to an adjacent cell when a predetermined condition is satisfied; a handover determination section that determines whether or not the predetermined condition is satisfied; and a handover processing section that starts handover to the adjacent cell indicated by the conditional handover command when the predetermined condition is satisfied.

This disclosure provides a wireless communication device that performs a communication with a wireless communication terminal by use of a control channel and a data channel and that provides an own cell connected to the wireless communication terminal, the device including: a conditional handover determination section that determines an adjacent cell, which is a target for handover of the wireless communication terminal, based on information transmitted from the wireless communication terminal or an environment which the wireless communication device provides to the wireless communication terminal and that selects, as handover to be performed by the wireless communication terminal, conditional handover which gives a command for starting handover to the adjacent cell when a predetermined condition is satisfied or condition-free handover; a wireless transmission section that transmits to the wireless communication terminal a conditional handover command which starts handover to the adjacent cell when the predetermined condition is satisfied; and a network transmission section that, on detecting that the wireless communication terminal has started handover, transfers data addressed to the wireless communication terminal to a wireless communication device which provides the adjacent cell.

This disclosure provides a wireless communication device that is capable of practicing a communication with a wireless communication terminal by use of a control channel and a data channel and that provides a cell adjacent to an own cell connected to the wireless communication terminal, the device including: a network receiving section that receives a handover request message transmitted from a wireless communication device that provides the own cell; a command generation section that generates, based on the handover request message, either a conditional handover command for commanding to start handover to an adjacent cell when a predetermined condition is satisfied or a condition-free handover command; and a network transmission section that transmits to the wireless communication device which provides the own cell a handover response message including the conditional handover command or the condition-free handover command generated by the command generation section, wherein the command generation section determines the predetermined condition based on an environment provided to the wireless communication terminal when generating the conditional handover command.

Advantageous Effects of Invention

By means of the handover control method, the wireless communication terminal, and the wireless communication device of the disclosure, even when signal reception quality of a data channel of an own cell connected to a wireless communication terminal differs from signal reception quality of a control channel of the own cell, handover to an adjacent cell can be performed in an appropriate circumstance during movement of the wireless communication terminal.

DESCRIPTION OF EMBODIMENTS (Process Leading to Content of Embodiments)

Figure 18:
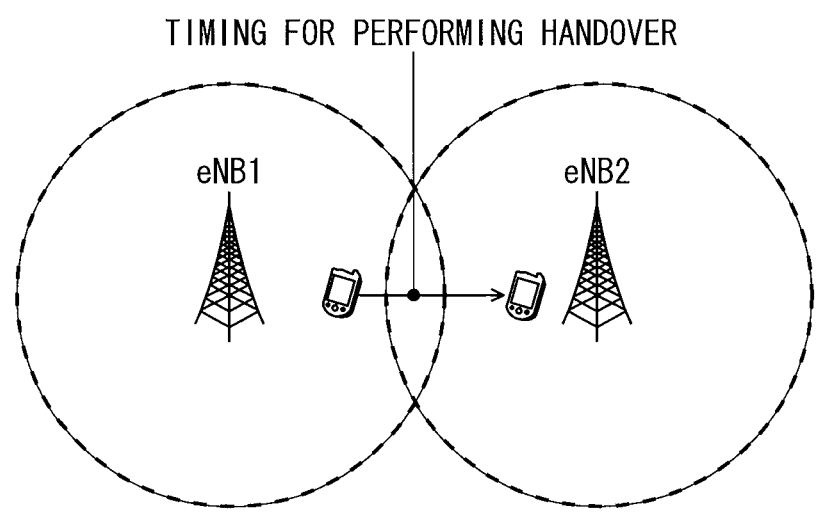
FIG. 18 It is a drawing showing example timing at which a terminal performs handover from an own cell to an adjacent cell.
Figure 19:
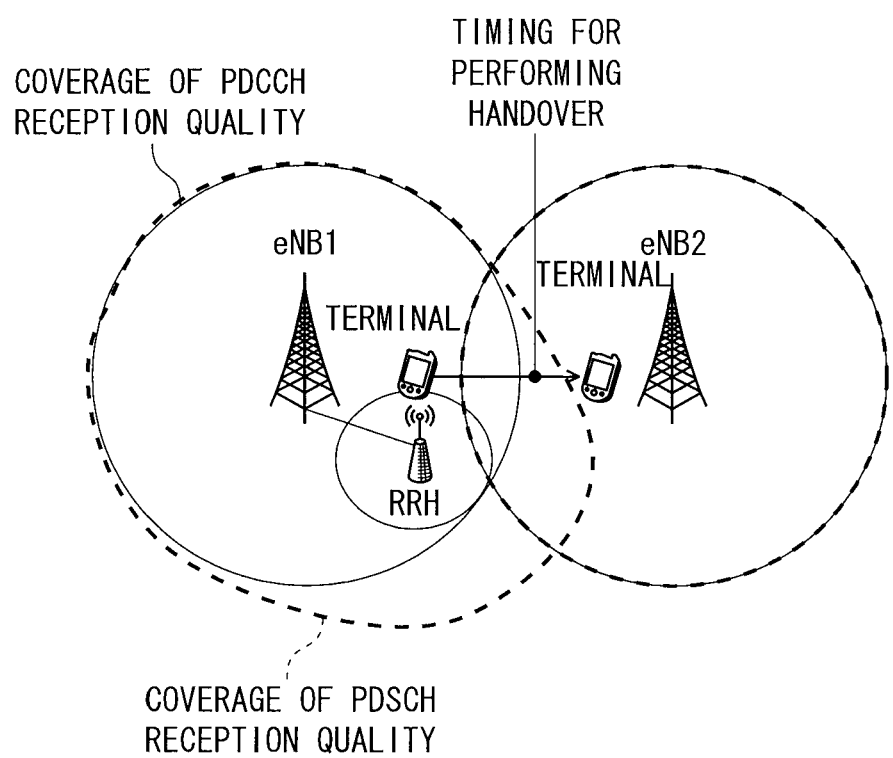
FIG. 19 It is a drawing showing example timing at which the terminal performs handover from the own cell to the adjacent cell when a terminal connected to a cell of a wireless communication base station eNB1 receives a PDSCH that is also transmitted in coordination from a remote base station (RRH).

Before explanation of embodiments of a wireless communication device of the disclosure, drawbacks of a related-art wireless communication device are first described by reference to FIG. 18 and FIG. 19. FIG. 18 is a drawing showing example timing at which a terminal performs handover from an own cell to an adjacent cell. In the example shown in FIG. 18, a coverage area that exhibits given reception quality of PDSCH or more and a coverage area that exhibits given reception quality of PDCCH (Physical Downlink Control Channel) or more are equal to each other within a cell provided by each of wireless communication base stations. Therefore, when a terminal that remains connected to a cell of the wireless communication base station eNB1 moves to a point A shown in FIG. 18, handover to an adjacent cell provided by a wireless communication base station eNB2 takes place. In this respect, the point A is an intermediate point between coverage areas of PDCCH reception quality of cells provided by respective wireless communication base stations.

If the wireless communication device transmits a PDSCH (Physical Downlink Shared Channel) in cooperation with another wireless communication device, a coverage area where the terminal receives the PDSCH can be broadened. FIG. 19 is a drawing showing example timing at which the terminal performs handover from the own cell to the adjacent cell when a terminal connected to a cell of a wireless communication base station eNB1 receives a PDSCH that is also transmitted in coordination from a remote base station (RRH). The RRH shown in FIG. 19 is installed at a location, which is separated from the wireless communication base station eNB1, and connected to the wireless communication base station eNB1 by means of an optical fiber cable, or the like. In the example shown in FIG. 19, the terminal receives the PDSCH from both the wireless communication base station eNB1 and the RRH. For this reason, the coverage area of PDSCH reception quality of the own cell which is received by the terminal is larger than the coverage area of PDCCH reception quality of the own cell.

In relation to a circumstance where the terminal performs handover from the own cell to an adjacent cell provided by the wireless communication base station eNB2, terminal throughput can be maintained at a high level in a circumstance where the PDSCH reception quality of the adjacent cell is superior to the PDSCH reception quality of the own cell. However, like the example shown in FIG. 19, when the coverage area of PDSCH reception quality of the own cell is larger than the coverage area of PDCCH reception quality of the same, timing at which the wireless communication base station eNB1 transmits a handover command to the terminal lags behind the timing described in connection with FIG. 18.

Under the circumstance, the terminal cannot receive a signal transmitted through the PDCCH of the own cell without fail, and hence there is a high probability that the terminal may unsuccessfully receive the handover command. The reason for this is that allocation of radio resources to be used by the terminal in order to receive the handover command is performed by means of the signal transmitted through the PDCCH. As a consequence, there occurs new procedures; namely, searching for a new cell and re-establishing a connect to the cell. Specifically, if the terminal fails to receive the handover command, a duration in which the terminal cannot establish a data communication with the wireless communication device will become longer when compared with a case where the terminal successfully performs handover.

A configuration of the wireless communication system pertinent to the disclosure is now described in detail by reference to the drawings. The wireless communication system of the embodiment to be described hereunder includes at least one wireless communication terminal and a plurality of wireless communication devices capable of performing a communication with the wireless communication terminal by way of a wireless communication network. In the following descriptions, a wireless communication terminal is simply called a "terminal". The terminal is, for instance, a cellular phone. Furthermore, in the following descriptions, the wireless communication device is a device with which a terminal can perform a wireless communication and which generically comprehends a wireless communication base station (E-UTRAN NodeB: eNB), a remote base station (Remote Radio Head: RRH) disposed at a position spaced apart from the wireless communication base station, a relay (Relay Node or a repeater) that is wirelessly connected to the wireless communication base station, or the like, and a femto base station, and a pico base station. The remote base station (RRH) has a function analogous to that of a wireless section (a Radio Frequency section: an RF section) of the wireless communication base station (eNB) and connected to the wireless communication base station (eNB) by means of a wired cable, like an optical fiber cable.

The wireless communication system utilizes an LTE or LTE-A mobile communication technique standardized by the 3GPP (the $3^{rd}$ Generation Partnership Project). In this respect, the mobile communication technique utilized by the wireless communication system is not restricted to the above standards and may conform to a wireless LAN (Wireless Local Area Network), IEEE802.16, WiMAX (Worldwide Interoperability for Microwave Access) such as IEEE802.16e or IEEE802.16m, 3GPP2, SAE (System Architecture Evolution), UMTS (Universal Mobile Telecommunications System), or the $4^{th}$ generation mobile communication standard.

Each of the wireless communication devices configures at least one communication cell. The communication cell refers to a wireless network object that the terminal can uniquely identify by means of an identifier allocated to a geographical area or a difference in frequencies used in geographical areas.

The communication cell is referred to simply as a "cell" in the following descriptions. One wireless communication device configures one or more cells for one or more carrier frequencies, respectively. The configuration is a fundamental concept, and the wireless communication device can also configure one cell in coordination with another wireless communication device. Further, the terminal carries out a communication by utilization of at least one of cells that the wireless communication devices configure.

Wireless communication systems of first through fourth embodiments are hereunder described in turn. In the first through fourth embodiments, the constituents that exhibit the same functions are assigned the same reference numerals, and their repeated explanations are omitted. The wireless communication systems which will be described in connection with the respective embodiments use a coordinated multiple point (CoMP) transmission/reception technique. The coordinated multiple point transmission/reception (CoMP) is a technique for enhancing terminal throughput by coordinated operation of a plurality of wireless communication devices. The plurality of wireless communications devices configure respective cells, and the terminal is connected to a cell (an own cell) provided by one wireless communication device in a CoMP set (a group of wireless communication devices that operate for one terminal in a coordinated fashion). In this regard, the plurality of wireless communication devices can also configure one cell. The terminal receives a physical downlink control channel (PDCCH) from the own cell, thereupon receiving by way of a physical downlink shared channel (PDSCH) a data packet that is addressed to the terminal and has been transmitted from the respective wireless communication devices of the CoMP set in coordination with each other. Therefore, in relation to the own cell, a coverage area that exhibits given PDSCH reception quality or more is larger than a coverage area that exhibits given PDCCH reception quality or more.

First Embodiment

By reference to FIG. 1 through FIG. 6, the wireless communication system of the first embodiment is described. The wireless communication system of the first embodiment is configured of the terminal and the wireless communication device that have been described above. By means of a downlink, the terminal receives a reference signal transmitted from the wireless communication device on a per-cell basis, notifying the wireless communication device about a measurement report (a measurement result) derived by a defined calculation formula. The wireless communication device allocates a radio resource (for instance, a frequency band in a frequency domain or a time domain) to each terminal and manages the thus-allocated radio resource and thus acts as an access point for the terminal in a wireless access network. In addition, the wireless communication device has a function of performing handover processing when determining a necessity of handover to another cell from the measurement result report from the terminal.

Figure 1:
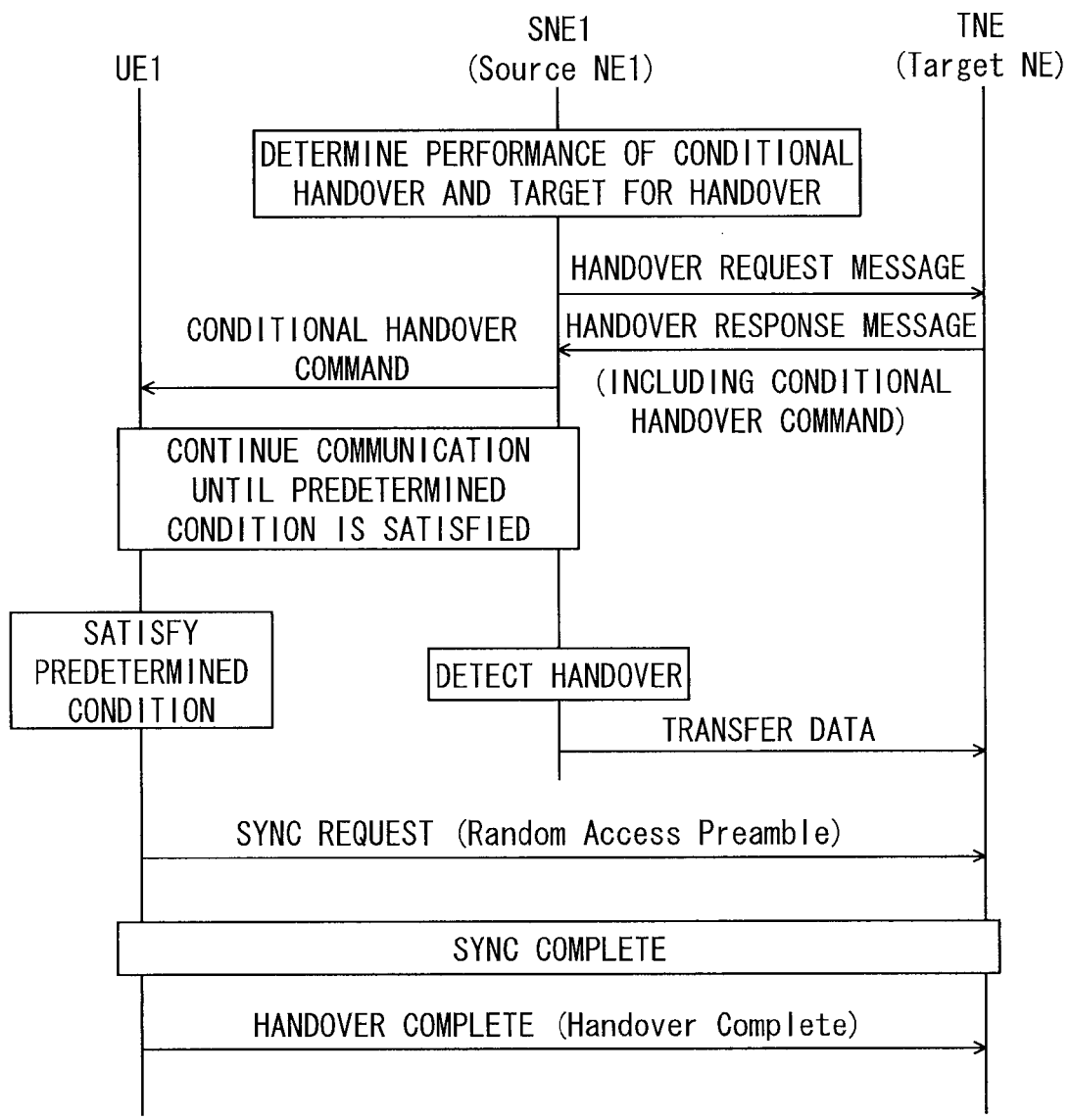
FIG. 1 It is a drawing showing an example timing chart employed when a terminal UE1 performs handover in a wireless communication system of a first embodiment.

FIG. 1 is a drawing showing an example timing chart employed when a terminal UE1 performs handover in a wireless communication system of a first embodiment. As shown in FIG. 1, a wireless communication device (Source Network Entity) SNE1 that provides a cell (Serving Cell, hereinafter called an "own cell") to which the terminal UE1 is connected receives a measurement result report (Measurement Report) or the like from the terminal UE1, determining performance of conditional handover and a target for handover. The source network entity SNE1 transmits a handover request message to a wireless communication device TNE (Target Network Entity) that is a target for handover. Upon receipt of the handover request message, the target network entity TNE performs handover acknowledgement processing. Next, the target network entity TNE transmits a handover response message including a conditional handover command to the source network entity SNE1. The source network entity SNE1 received the handover response message transmits the conditional handover command to the terminal UE1. The conditional handover command includes predetermined conditions that are necessary to determine timing at which the terminal UE1 performs handover.

Upon receipt of the conditional handover command, the terminal UE1 consecutively monitors whether or not predetermined conditions to be described later are satisfied. The terminal UE1 does not start handover until the predetermined condition is satisfied and keeps a communication with the source network entity SE1. Put another way, the terminal UE1 halts the communication with the source network entity SNE1 when the predetermined condition is satisfied, starting to perform handover to a cell (an adjacent cell) provided by the target network entity TNE1 indicated by the conditional handover command. When detecting that the terminal UE1 started handover by means of any method, the source network entity SNE1 starts transferring the data addressed to the terminal UE1 to the target network entity TNE, notifying a sequence number used for starting transmission of the data addressed to the terminal UE1, and notifying a sequence number used for receiving the data from the terminal UE1.

In this regard, the followings are also possible. Namely, the source network entity SNE1 starts transferring data to the target network entity TNE in advance before detecting handover from the terminal UE1. Detecting that the terminal UE1 has started handover, the source network entity SNE1 notifies the target network entity TNE of the sequence number used for starting transmission of the data addressed to the terminal UE1 and the sequence number for receiving the data from the terminal UE1. This enables the terminal UE1 to receive the data from the target network entity TNE immediately after handover. In addition, the target network entity TNE can ascertain which data should first be transmitted to the terminal UE1, and hence transmission of the data that are already received by the terminal to the terminal can be circumvented.

The terminal UE1 started handover first transmits a random access preamble (Random Access Preamble) as an uplink sync establishment request to the target network entity TNE indicated by the conditional handover command. Synchronized with the target network entity TNE, the terminal UE1 transmits a handover complete message (Handover Complete) to the target network entity TNE. Under the above procedures, the terminal UE1 performs handover from the own cell provided by the source network entity SNE1 to the adjacent cell provided by the target network entity TNE.

Condition 1 through Condition 11 are now described hereunder as examples of the foregoing predetermined conditions. The predetermined conditions can be those that differ from Conditions 1 through 11 within a scope where the objective of the disclosure is accomplished. In the configuration of the embodiment shown in FIG. 1, the target network entity TNE received the handover request message sets a predetermined condition. Timing at which the terminal UE1 starts handover varies depending on which one of Condition 1 through Condition 11 is set as a predetermined condition.

(Condition 1)

Condition 1 is that PDSCH reception quality of a cell (an adjacent cell) which is a target for handover indicated by the conditional handover command should be superior to PDSCH reception quality of the own cell. A period of time during which the terminal is connected to a cell which exhibits high PDSCH reception quality becomes longer by setting Condition 1 as a condition for starting handover. Therefore, radio resources can be effectively utilized, and use efficiency of a terminal frequency can be maintained at a high level.

In a case where Condition 1 is set, the terminal derives PDSCH reception quality of a target cell for handover from an RSRP that is measured by use of a cell reference signal (Cell-Specific Reference Symbol: CRS). Further, on the premise that the conditional handover command includes an offset value, the terminal can also calculate PDSCH reception quality of the target cell for handover by adding an offset value to a measurement result measured by use of a CRS. Since measurement of reception quality involving use of a CRS has hitherto been performed, a great change does not need to be made to terminal specifications in order to acquire PDSCH reception quality of the target cell for handover.

Alternatively, the terminal can also measure, as a PDSCH of the own cell, reception quality of a PDSCH being currently used by use of CSI-RS (CSI Reference Signals) in a PDSCH domain. In this respect, the terminal can also measure reception quality of only the PDSCH being currently used by use of the CSI-RS and derive PDSCH reception quality of the target cell for handover by use of a measurement result that uses the above-described CRS.

Furthermore, the terminal can also measure, as the PDSCH of the own cell, reception quality of the PDSCH being currently used by use of DMRS (Demodulation Reference Signals) in the PDSCH domain. In this respect, the terminal can also measure only reception quality of the PDSCH being currently used by use of the DMRS and derive the PDSCH reception quality of the target cell for handover by use of the measurement result that uses the CRS. The method for measuring a PDSCH, however, is not limited to the above method and can also employ any other method.

(Condition 2)

Condition 2 is that the PDCCH reception quality of the cell (the own cell), which is measured by the terminal now connected to the cell, should be lower than a threshold value. If Condition 2 is set as a condition for starting handover, handover is started immediately after the terminal has become incapable of receiving data from the own cell or immediately before the terminal becomes incapable of receiving data from the own cell. Consequently, a non-communication period during which the terminal cannot receive data can be minimized.

A threshold value to be compared with the PDCCH reception quality of the own cell is included in the conditional handover command. In this respect, however, the threshold value can be a value at which the terminal becomes incapable of receiving the PDCCH of the own cell. In this case, the terminal can hold the threshold value. Incidentally, the conditional handover command can also be notified such that a value that is held by the terminal and at which the terminal becomes incapable of receiving the PDCCH of the own cell is used as a threshold value.

(Condition 3)

Condition 3 is that Condition 1 or Condition 2 should be satisfied. The non-communication period can be minimized while consideration is given to PDSCH reception quality by setting Condition 3 as a condition for starting handover.

(Condition 4)

Condition 4 is that a time which has elapsed since a conditional handover command was received should reach a "handover start limit time." The terminal starts handover immediately before Condition 4 is satisfied. By setting Condition 4 as a condition for starting handover, a limit can be imposed on a time during which a target network entity waits until a terminal performs handover. So long as the target network entity takes into account a delay from when the terminal performs handover until when handover to an adjacent cell actually takes place, the terminal can also start handover after Condition 4 is satisfied. In this case, a period during which the target network entity reserves a resource for a terminal which will perform handover can be minimized.

(Condition 5)

Condition 5 is a condition for halting conditional handover processing rather than a condition for starting handover. Condition 5 is that a time which has elapsed since a conditional handover command was received should reach a "conditional handover cancel time." The terminal halts processing of conditional handover when Condition 5 is satisfied. As a result of Condition 5 being set as a condition for halting conditional handover, a limitation can be imposed on a time during which the target network entity waits for a terminal which performs handover. Alternatively, the terminal can also halt processing a conditional handover immediately before Condition 5 is satisfied. In this case, a period of time during which the target handover reserves a resource for a terminal which will perform handover can be minimized.

(Condition 6)

Condition 6 is that Condition 1 or Condition 4 should be satisfied.

(Condition 7)

Condition 7 is that Condition 5 or Condition 1 should be satisfied. If Condition 5 is satisfied before Condition 1 is satisfied, the terminal halts conditional handover processing.

(Condition 8)

Condition 8 is that Condition 2 or Condition 4 should be satisfied.

(Condition 9)

Condition 9 is that Condition 2 should be satisfied before Condition 5 is satisfied. If Condition 5 is satisfied before Condition 2 is satisfied, the terminal halt conditional handover processing.

(Condition 10)

Condition 10 is that Condition 3 or Condition 4 should be satisfied. Put another way, Condition 10 is that Condition 1, Condition 2, or Condition 4 should be satisfied.

(Condition 11)

Condition 11 is that Condition 3 should be satisfied before Condition 5 is satisfied. If Condition 5 is satisfied before Condition 3 is satisfied, the terminal halt conditional handover processing.

(Condition 12)

Condition 12 is a condition for halting conditional handover processing rather than a condition for starting handover. Condition 12 is that PDCCH reception quality of the own cell measured by the terminal should be higher than a threshold value.

(Condition 13)

Condition 13 is a condition for halting conditional handover processing rather than a condition for starting handover. Condition 13 is that PDCCH reception quality of the own cell measured by the terminal should be higher than PDCH reception quality of the target for handover measured by the terminal. In this case, a determination can be made by incorporating an offset into reception quality.

(Condition 14)

Condition 14 is a condition for halting conditional handover processing rather than a condition for starting handover. Condition 14 is that PDSCH reception quality of the own cell measured by the terminal is higher than PDCCH reception quality of the target for handover measured by the terminal.

Aside from the above-described predetermined conditions, the terminal UE1 and the target network entity TNE each can also have a timer that holds an individual resource of a random access preamble. In this case, the target network entity TNE puts a value of a timer that holds an individual resource of a random access preamble (an individual RACH holding timer) in a conditional handover command. Upon receipt of a conditional handover command including a value of the individual RACH holding timer, the terminal UE1 starts counting the individual RACH holding timer. In the course of the individual PRACH holding timer keeping count, the terminal UE1 transmits a random access preamble by use of an individual resource at the time of handover. In the meantime, when the individual RACH holding timer expires (expire) before the terminal UE1 starts handover, the terminal UE1 determines that the individual resource of the random access preamble is not usable, starting a contention-based (contention) random access (Random Access Procedure). A limit can thereby be placed on the number of individual resources of the random access preamble that the network consumes for one terminal.

Incidentally, the terminal UE1 holds the value of the individual RACH holding timer. When the conditional handover command includes an individual resource of the random access preamble, the terminal can start the individual RACH holding timer at all times. In addition, when the conditional handover command includes the value of the individual RACH holding timer, the terminal itself can update the value of the individual RACH holding timer. In this regard, the conditional handover command may include a flag indicating whether or not to use the individual RACH holding timer.

[Configuration of the Terminal UE1 of the First Embodiment]

Figure 2:
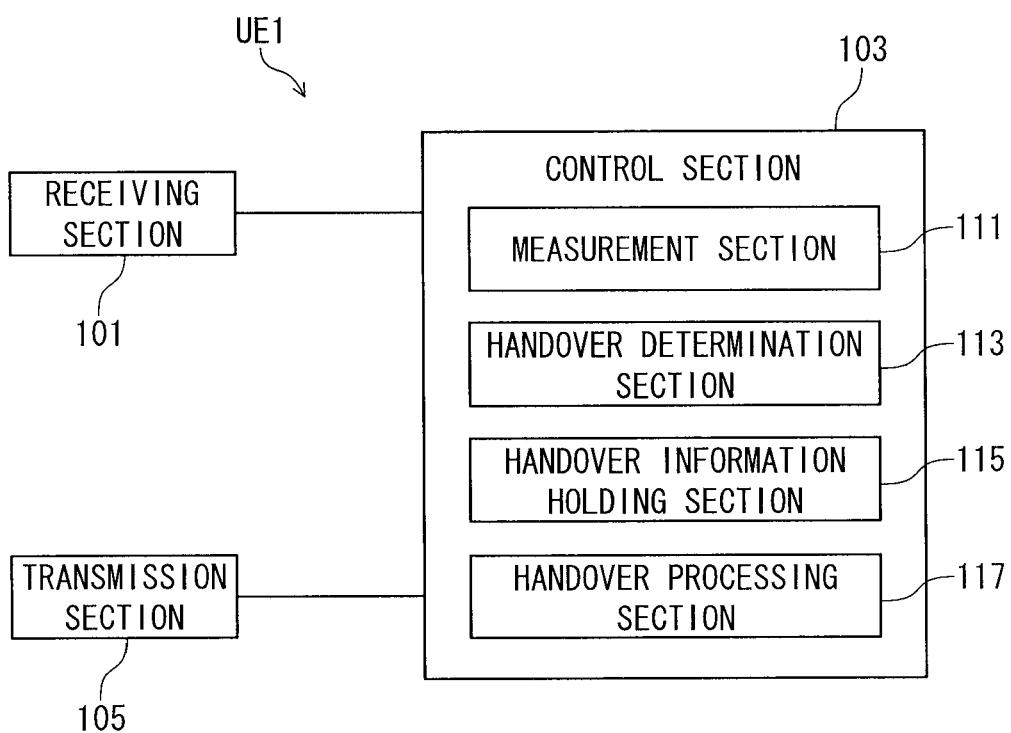
FIG. 2 It is a block diagram of the terminal UE1 that configures the wireless communication system of the first embodiment.

FIG. 2 is a block diagram of the terminal UE1 that configures the wireless communication system of the first embodiment. As shown in FIG. 2, the terminal UE1 of the first embodiment includes a receiving section 101, a control section 103, and a transmission section 105. The control section 103 has a measurement section 111, a handover determination section 113, a handover information holding section 115, and a handover processing section 117. In addition, the terminal UE1 has a timer (not shown) for counting a time that has elapsed since the conditional handover command was received when the aforementioned, predetermined condition is anyone of Condition 4 through Condition 11. Finishing counting up a time set by the conditional handover command, the timer expires (expire).

In accordance with a command from the control section 103, the receiving section 101 receives annunciation information or control information like individual control information byway of a downlink of the cell to which the terminal UE1 is connected. The receiving section 101 outputs the thus-received annunciation information or the individual control information to the control section 103. In accordance with the command from the measurement section 111 of the control section 103, the receiving section 101 receives a reference signal (e.g., a cell reference signal (Cell Reference Signal: CRS)) or measures strength of a received signal (Received Signal Strength Indication: RSSI). The receiving section 101 outputs the thus-received reference signal or the measurement result, such as an RSSI, to the measurement section 111. The receiving section 101 receives a random access response (Random Access Response) from the target cell for handover, outputting the thus-received response to the control section 103.

The control section 103 commands the receiving section 101 to receive the annunciation information, the individual control information, or the like. The annunciation information or the control information, like individual control information, received by the receiving section 101 is input to the control section 103. The control section 103 determines whether or not a conditional handover command is included in the thus-input control information. When the control information including the conditional handover command is input, the control section 103 inputs the predetermined condition included in the conditional handover command to the handover determination section 113. The control section 103 also stores information, which is necessary for handover, into the handover information holding section 115. In addition, when the handover determination section 113 makes a determination to start handover, the control section 103 reads information necessary for handover from the handover information holding section 115, outputting the thus-read information to the handover processing section 117.

The control section 103 also commands the transmission section 105 to transmit an ACK/NACK signal in response to the thus-received signal. Further, in order to generate a CSI report or a measurement result report conforming to the control information, the control section 103 commands the measurement section 111 of the control section 103 to measure necessary information. Further, the control section 103 generates the CSI report or the measurement result report (Measurement Report) from the information input by the measurement section 111, outputting the thus-generated report to the transmission section 105.

Moreover, when information necessary for synchronization with a random access response from the cell of the target cell for handover is input from the receiving section 101, the control section 103 outputs the information to the handover processing section 117.

The transmission section 105 transmits an ACK/NACK signal responding to the signal received from the cell to which the terminal UE1 is connected. The transmission section 105 also transmits the CIS report or the measurement result report input from the control section 103 to the wireless communication device that provides the cell. Furthermore, in accordance with a notification from the handover processing section 117, the transmission section 105 transmits a random access preamble (Random Access Preamble) to the target cell for handover. The transmission section 105 also transmits a handover complete message (Handover Complete) generated by the control section 103 to the target cell for handover.

Constituents of the control section 103 are hereunder described. In accordance with a command from the control section 103 or the handover determination section 113, the measurement section 111 commands the receiving section 101 to receive the reference signal or measure the strength of a received signal (RSSI). In addition, the reference signal is a cell reference signal (CRS), a CSI-RS, or a DMRS, and which one of the signals is to be received is commanded by the control information. The measurement section 111 outputs to the control section 103 information that is necessary for preparing the CSI report or the measurement result report (Measurement Report). Further, in accordance with the command from the handover determination section 113, the measurement section 111 outputs to the handover determination section 113 information that is necessary for the handover determination section 113 to make a determination from a predetermined condition.

The handover determination section 113 requests the measurement section 111 to provide information that is necessary for making a determination from the predetermined condition included in the conditional handover command. The handover determination section 113 determines whether or not the information input from the measurement section 111 satisfies a predetermined condition, or the like, thereby determining whether or not to start handover. Having determined to start handover, the handover determination section 113 notifies the handover processing section 117 of the determination.

The handover information holding section 115 holds information necessary for handover to an adjacent cell. Information required for handover to an adjacent cell is one included in a conditional handover command or a related-art handover command which does not require the condition. The information includes, for instance, a measurement setting (Measurement Configuration), movement control information (Mobility Control Information), a radio resource setting (Radio Resource Configuration), a security setting (Security Configuration), and the like.

When information necessary for handover to an adjacent cell is input, the handover processing section 117 starts processing of handover to an adjacent cell in accordance with the information. When the thus-input information includes an individual resource for a random access, the handover processing section 117 notifies the transmission section 105 to perform a random access by use of the resource. In the meantime, when the thus-input information does not include the individual resource for a random access, the handover processing section 117 notifies the transmission section 105 to perform a contention-based random access (Random Access Procedure). Synchronized with the target cell for handover, the handover processing section generates a handover complete message (Handover Complete), outputting the message to the transmission section 105.

[Operation of the Terminal UE1 of the First Embodiment]

Figure 3:
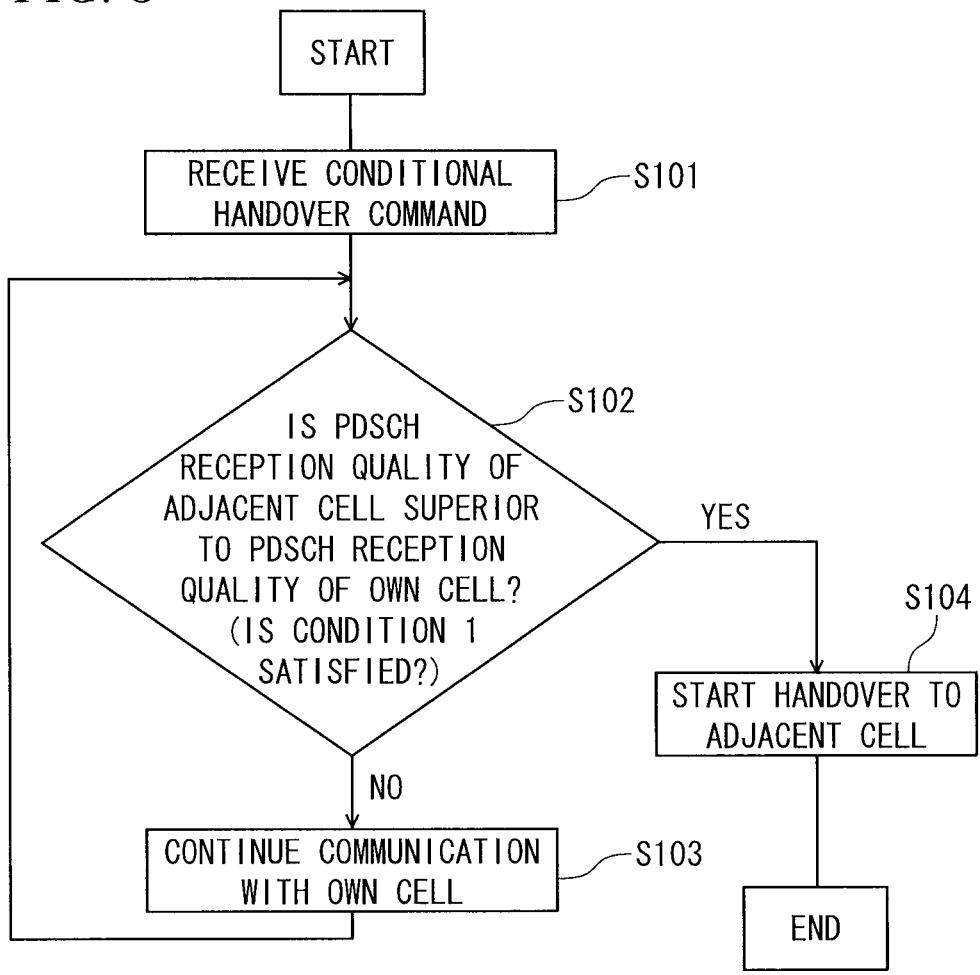
FIG. 3 It is a flowchart showing operation of the terminal UE1 of the first embodiment when a predetermined condition is Condition 1.

FIG. 3 is a flowchart showing operation of the terminal UE1 of the first embodiment performed when the predetermined condition is Condition 1. As shown in FIG. 3, the terminal UE1 receives the conditional handover command (step S101). The terminal UE1 determines whether or not the PDSCH reception quality of the target cell for handover is superior to the PDSCH reception quality of the own cell (i.e., the PDSCH reception quality that is currently in use) (step S102). When a determination result rendered in step S102 is No, processing proceeds to step S103. In contrast, when the result is Yes, processing proceeds to step S104. The terminal UE1 continues a communication with the own cell in step S103, thereupon returning to step S102. In step S104, the terminal UE1 halts the communication with the own cell and starts handover to the target cell for handover.

Figure 4:
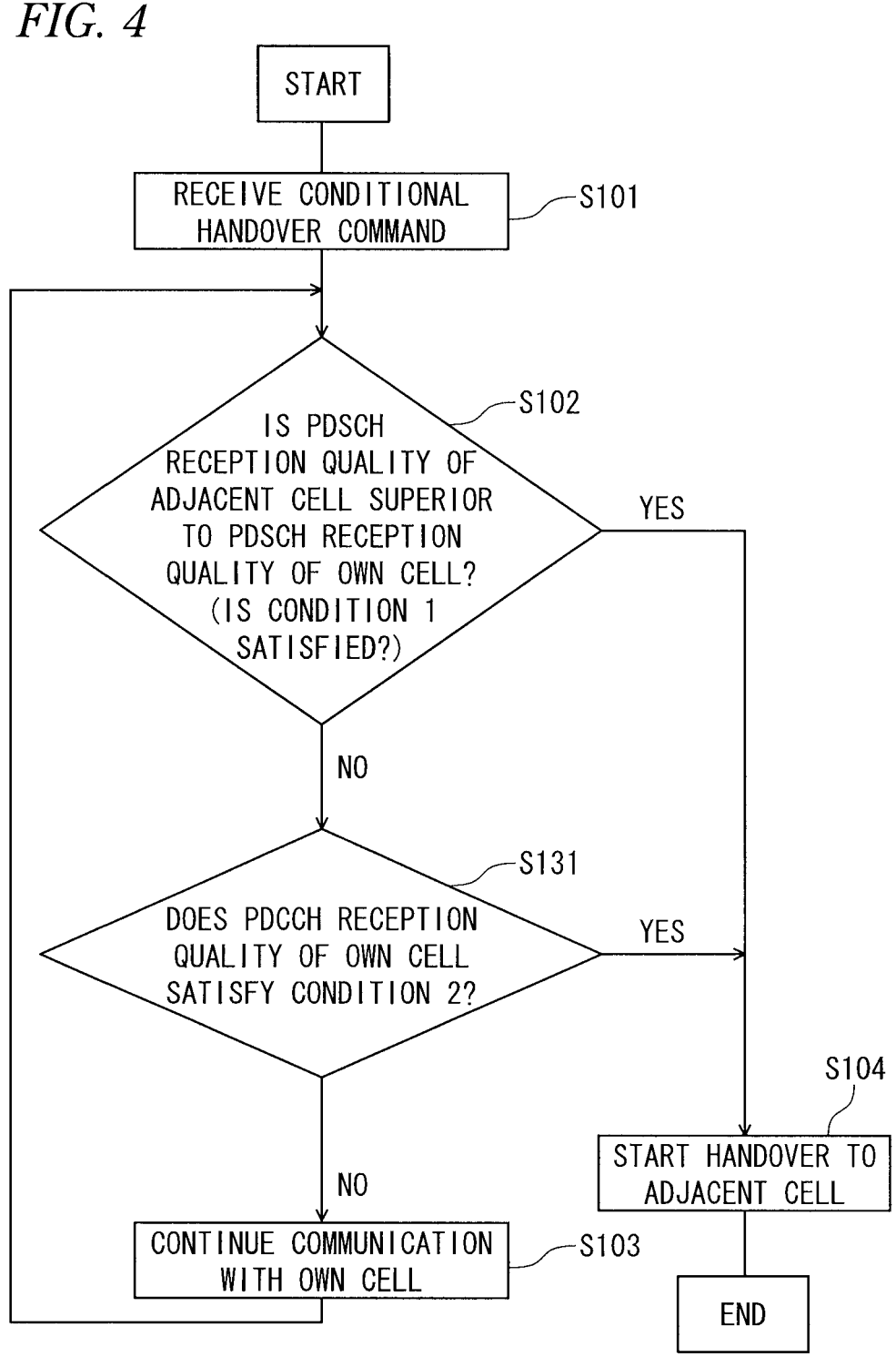
FIG. 4 It is a flowchart showing operation of the terminal UE1 of the first embodiment performed when a predetermined condition is Condition 3.

FIG. 4 is a flowchart showing operation of the terminal UE1 of the first embodiment performed when a predetermined condition is Condition 3. As shown in FIG. 4, the terminal UE1 receives a conditional handover command (step S101). The terminal UE1 determines whether or not the PDSCH reception quality of the target cell for handover is superior to the PDSCH reception quality of the own cell (i.e., the PDSCH reception quality that is currently in use) (step S102). When a determination result made in step S102 is No, processing proceeds to step S131. In contrast, when the determination result is Yes, processing proceeds to step S104. In step S131, the terminal UE1 determines whether or not the PDCCH reception quality of the own cell meets Condition 2. When a determination result rendered in step S131 is No, processing proceeds to step S103. In contrast, when the determination result is Yes, processing proceeds to step S104. In step S103, the terminal UE1 continues the communication with the own cell, thereupon returning to step S102. In step S104, the terminal UE1 halts the communication with the own cell, starting handover to the target cell for handover.

[Configuration of the Source Network Entity SNE1 (Source NE1) of the First Embodiment]

Figure 5:
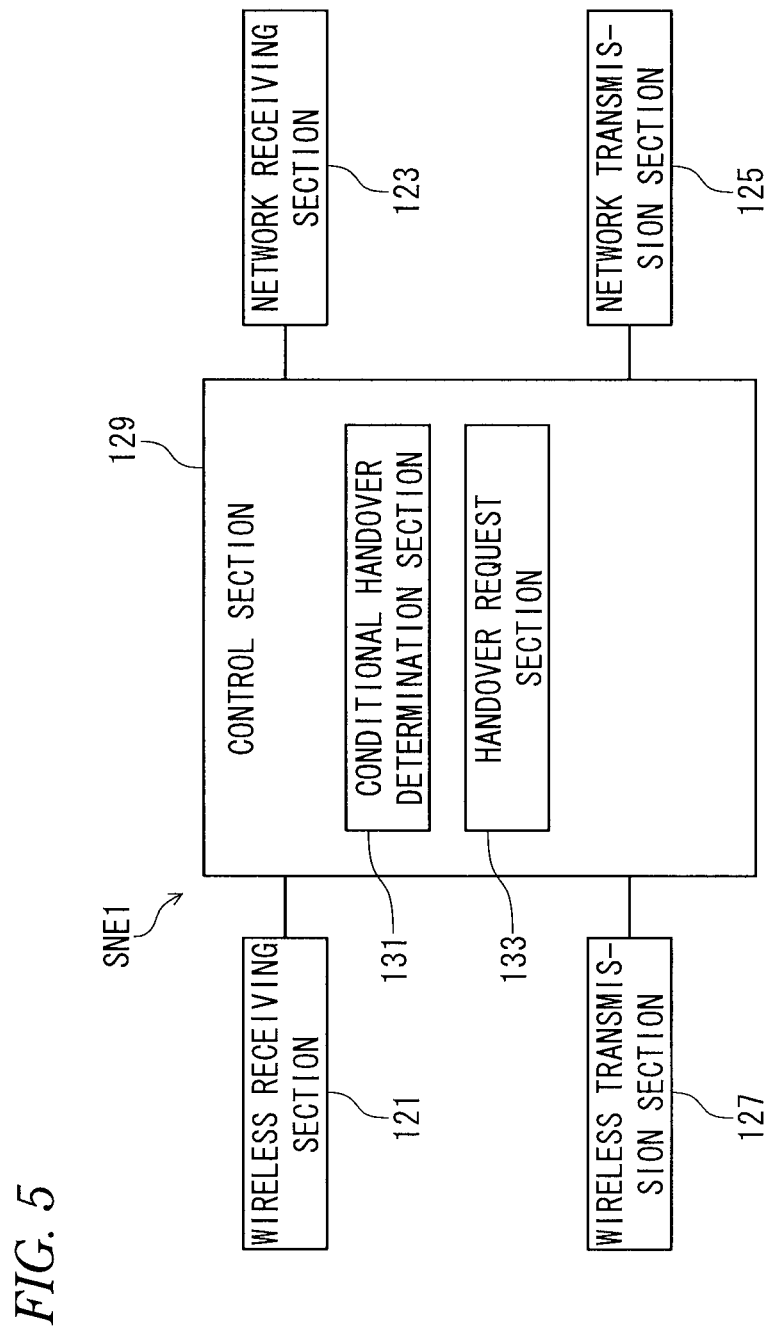
FIG. 5 It is a block diagram of a wireless communication device SNE1 that configures the wireless communication system of the first embodiment.

FIG. 5 is a block diagram of the source network entity SNE1 that configures the wireless communication system of the first embodiment. As shown in FIG. 5, the source network entity SNE1 that configures the wireless communication system of the first embodiment includes a wireless receiving section 121, a network receiving section 123, a network transmission section 125, a wireless transmission section 127, and a control section 129. The control section 129 has a conditional handover determination section 131 and a handover request section 133.

The wireless receiving section 121 receives a message responding to individual control information transmitted from the terminal UE1, a measurement result report (Measurement Report), an ACK/NACK, and a CSI report, outputting the thus-received message, report, or signal, to the control section 129. The network transmission section 125 transmits a handover request message to the target network entity TNE that provides the target cell for handover. Also, the network transmission section 125 transfers to the target network entity TNE the data addressed to the terminal UE1. In addition, the network transmission section 125 notifies the target network entity TNE of a sequence number (Sequence Number) for starting transmission of the data addressed to the terminal UE1 and a sequence number for receiving data from the terminal UE1. The network receiving section 123 receives a handover response message that is transmitted from the target network entity TNE and that includes a conditional handover command. The wireless transmission section 127 transmits the conditional handover command to the terminal.

The control section 129 outputs the measurement result report (Measurement Report) received by the wireless receiving section 121 to the conditional handover determination section 131. When the terminal UE1 has not yet generated a measurement result report that differentiates between PDCCH reception quality and PDSCH reception quality, the control section 129 outputs to the conditional handover determination section 131 information about an environment that the source network entity SNE1 currently provides to the terminal UE1 (e.g., a traffic status, use/non-use of a CoMP technique, use/non-use of a MIMO technique, the number of antennas, use/non-use of a heterogeneous network environment, or a gain of PDSCH reception quality with respect to PDCCH reception quality).

When information necessary for a handover request message is requested by the handover request section 133, the control section 129 outputs setting information about the terminal UE1 to the handover request section 133. When the network receiving section 123 receives the handover response message that has been transmitted from the target network entity TNE and that includes the conditional handover command, the control section 129 performs control such that the wireless transmission section 127 transmits the conditional handover command to the terminal UE1.

Detecting that the terminal UE1 has started handover after transmitting the conditional handover command to the terminal UE1, the control section 129 controls the network transmission section 125 such that the data addressed to the terminal UE1 are transferred to the target network entity TNE that provides the target cell for handover. Detecting that the terminal UE1 has started handover, the control section 129 controls the network transmission section 125 such that the target network entity TNE that provides the target cell for handover is notified of a sequence number (Sequence Number) for starting transmission of the data addressed to the terminal UE1 and the sequence number for receiving the data from the terminal UE1. Incidentally, the control section 129 determines that the terminal UE1 has started handover when at least one of the following conditions is satisfied. In this regard, conditions other than those mentioned below can also be used.

1. A value of the CSI report represents "Out of Range."
2. A transmission of a CSI report has not yet reached.
3. A transmission of an ACK/NACK signal has not yet reached.

Incidentally, the source network entity SNE can also detect completion of handover at timing when the target network entity TNE notifies the source network entity SNE of completion of handover after the terminal UE1 has performed handover.

Respective constituents of the control section 129 are hereunder described. The conditional handover determination section 131 determines a target cell for handover on the basis of the measurement result report received by the wireless receiving section 121 or the environment currently provided to the terminal UE1 by the source network entity SNE1, selecting either conditional handover or ordinary handover as a type of handover to be performed by the terminal UE1. A criterion employed when the conditional handover determination section 131 selects conditional handover is; for instance, whether or not throughput becomes high as a result of the terminal UE1 staying in a connected cell or whether or not a connection with the terminal UE1 can be maintained as a traffic status. However, the criterion is not limited to them.

When conditional handover is selected, the conditional handover determination section 131 outputs to the handover request section 133 both information mentioning that the conditional handover was selected and information about a target cell for handover.

When information mentioning that the conditional handover was selected and information about the target cell for handover are input from the conditional handover determination section 131, the handover request section 133 acquires from the control section 129 information that is received by the wireless receiving section 121 and necessary for handover, like a measurement result report. The handover request section 133 generates a handover request message including the environment that the source network entity SNE1 is currently offering to the current terminal UE1. The handover request section 133 outputs the handover request message to the network transmission section 125.

In this respect, as a result of the handover request message including the environment that the source network entity SNE1 currently provides to the terminal UE1, the target network entity TNE that provides a target cell for handover can determine specifics of predetermined conditions included in the conditional handover command.

[Configuration of the Target Network Entity (Target NE) of the First Embodiment]

Figure 6:
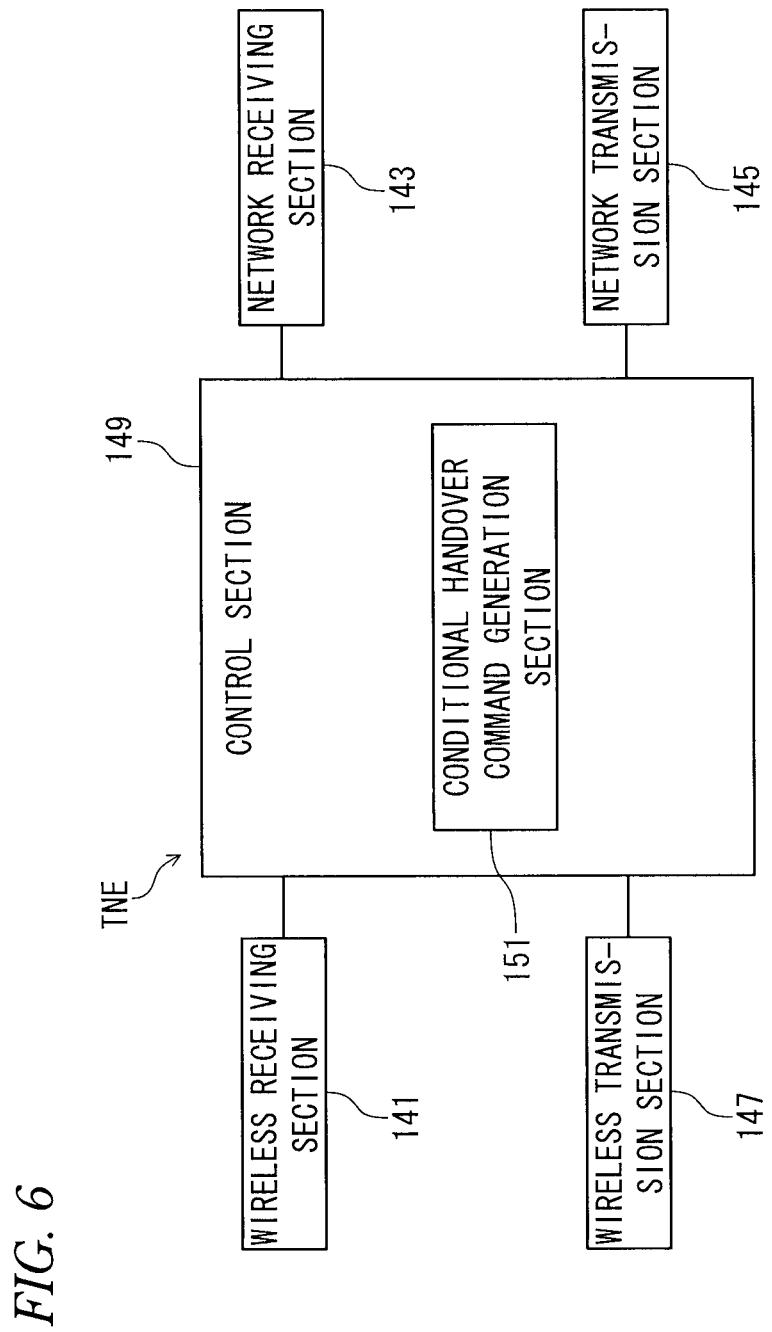
FIG. 6 It is a block diagram of a wireless communication device TNE that configures the wireless communication system of the first embodiment.

FIG. 6 is a block diagram of the target network entity TNE that configures the wireless communication system of the first embodiment. As shown in FIG. 6, the target network entity TNE of the first embodiment includes a wireless receiving section 141, a network receiving section 143, a network transmission section 145, a wireless transmission section 147, and a control section 149. The control section 149 has a conditional handover command generation section 151. When the described predetermined condition is any of Conditions 4 through 11, the target network entity TNE has a timer (not shown) for counting a time that has elapsed since the handover response message including the conditional handover command was transmitted. A time at which the timer expires is loner than a time at which the timer of the terminal UE1 expires.

The wireless receiving section 141 receives a random access preamble (Random Access Preamble), which is a sync request from the terminal, or a handover complete message (Handover Complete), thereupon outputting the thus-received preamble or the message to the controls section. The network receiving section 143 receives the handover request message transmitted from the source network entity SNE1 that provides a source cell for handover. The network transmission section 145 transmits the handover response message including the conditional handover command to the source network entity SNE1 that has transmitted the handover request message. The wireless transmission section 147 transmits to the terminal UE1 a random access response message that responds to the random access preamble transmitted from the terminal UE1.

The control section generates a random access response message that responds to the random access preamble received by the wireless receiving section 141, outputting the message to the wireless transmission section 147. Further, upon receipt of the handover request message, the control section 149 determines whether or not to accept the request. When the handover request is determined to be accepted, the control section 149 outputs to a conditional handover command generation section 151 an environment that is to be provided to a terminal which will perform handover and the handover request message.

From information input by the control section 149 (a handover request message and an environment provided to the terminal that performs handover), the conditional handover command generation section 151 determines whether or not the conditional handover is normal handover. In addition, on determining to perform conditional handover, the conditional handover command generation section 151 determines a predetermined condition from the information input from the control section 149 (the handover request message and the environment provided to a terminal that performs handover), generating a conditional handover command including the predetermined condition. The conditional handover command generation section 151 outputs the thus-generated conditional handover command to the network transmission section 145. When normal handover is requested by the handover request message or when normal handover is determined to be performed, the conditional handover command generation section 151 generates a normal handover command.

Although the above descriptions state that the target network entity TNE determines the predetermined condition and generates the conditional handover command, the following methods can also be adopted.

1. The source network entity SNE1 determines a predetermined condition, transmitting the predetermined condition to the target network entity TNE1 along with a handover request message. The target network entity TNE generates a conditional handover command from the predetermined condition.

2. After receiving a handover response message including the conditional handover command from the target network entity TNE, the source network entity SNE1 can also make a change to the predetermined condition represented by the conditional handover command and subsequently transmit the handover command to the terminal UE1.

As mentioned above, in the embodiment, even when a difference exists between the coverage of PDCCH reception quality and the coverage of PDSCH reception quality of the own cell, the terminal starts handover when the predetermined condition is satisfied in response to the conditional handover command sent from the wireless communication device. A predetermined condition employed at the occasion of the start of handover is based on PDSCH reception quality of the own cell and PDSCH reception quality of an adjacent cell that is a target for handover or PDCCH reception quality of the own cell, or based on a time that has elapsed since the conditional handover command was received. Therefore, compared with a case where handover is performed at an intermediate position between the coverage of PDCCH reception quality of one cell and the coverage of PDCCH reception quality of another cell, a signal of the PDCCH of the own cell can be received more reliably under a circumstance of the embodiment in which the terminal performs handover. Specifically, the terminal can perform handover without fail in an appropriate condition.

Second Embodiment

By reference to FIGS. 7 through 10, a wireless communication system of a second embodiment is described. The wireless communication system of the second embodiment differs from its counterpart wireless communication system of the first embodiment in that, determining to start handover from a predetermined condition represented by the conditional handover command, the terminal transmits a "handover start message" to the wireless communication device that provides the own cell connected to the terminal. The wireless communication system is analogous to that described in connection with the first embodiment except for the above. In FIGS. 7 through 10, constituents or steps corresponding to their counterparts described in connection with the first embodiment are assigned the same reference numerals.

Figure 7:
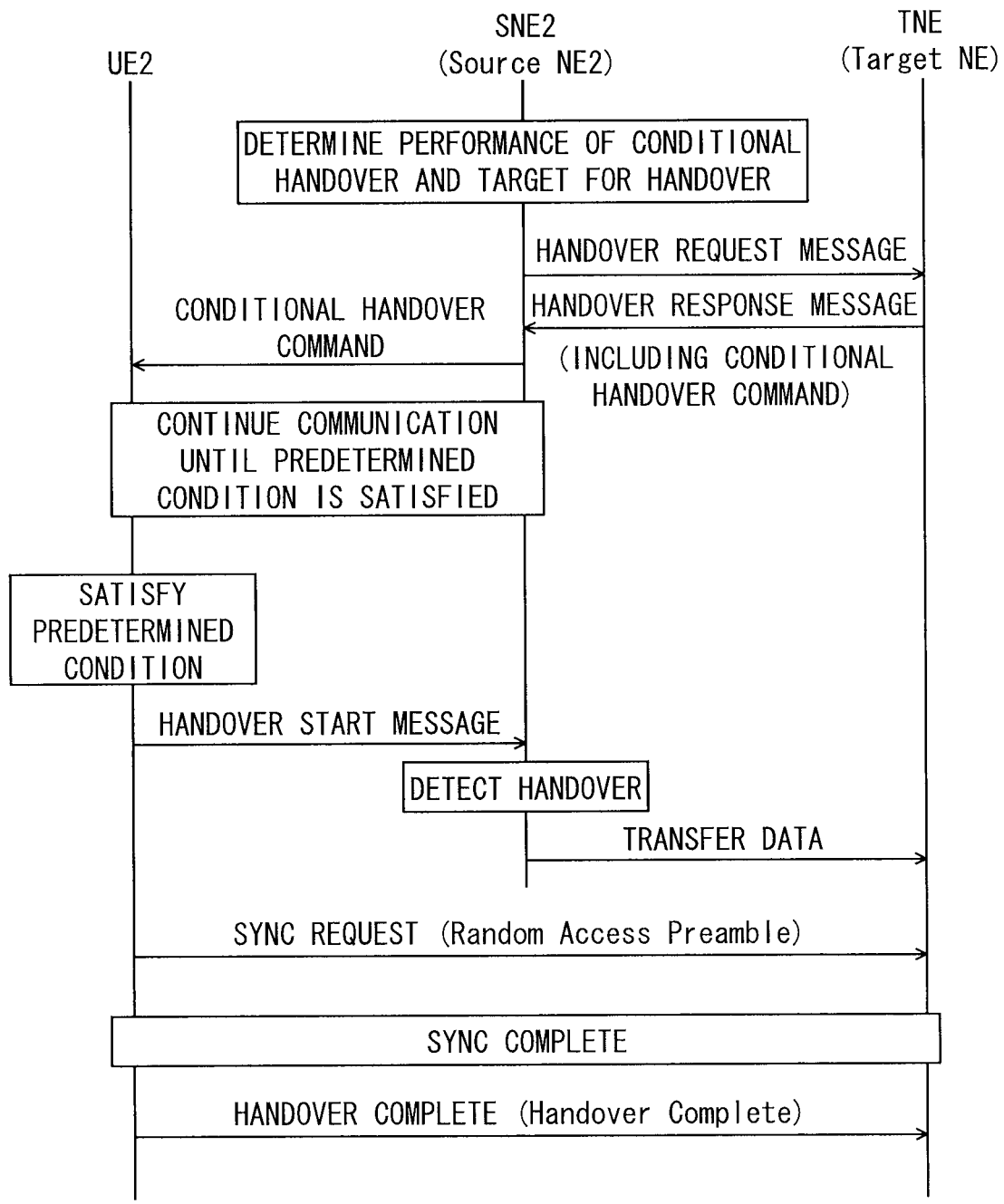
FIG. 7 It is a drawing showing an example timing chart employed when a terminal UE2 performs handover in a wireless communication system of a second embodiment.

FIG. 7 is a drawing showing an example timing chart employed when a terminal UE2 performs handover in the wireless communication system of the second embodiment. As shown in FIG. 7, a source network entity SNE2 that provides an own cell connected to the terminal UE2 receives a measurement result report (Measurement Report) from the terminal UE2, determining performance of conditional handover and a target for handover in much the same way as in the first embodiment. Next, the source network entity SNE2 transmits a handover request message to a target network entity. Upon receipt of the handover request message, the target network entity TNE performs handover acknowledgment processing. Subsequently, the target network entity TNE transmits the handover response message including a conditional handover command to the source network entity SNE2. The source network entity SNE2 received the handover response message transmits the conditional handover command to the terminal UE2. The conditional handover command includes a predetermined condition necessary for the terminal UE2 to determine handover start timing.

Even having received the conditional handover command, the terminal UE2 does not start handover until the predetermined condition described in connection with the first embodiment is satisfied, continuing a communication with the source network entity SNE2. Put another way, when the predetermined condition is satisfied, the terminal UE2 transmits a "handover start message" to the source network entity SNE2. Next, the terminal UE2 halts the communication with the source network entity SNE2, starting handover to an adjacent cell provided by the target network entity TNE that is indicated by the conditional handover command. In addition, upon receipt of the handover start message transmitted from the terminal UE2, the source network entity SNE2 starts transferring to the target network entity TNE the data addressed to the terminal UE2. The source network entity SNE2 also notifies the target network entity TNE of a sequence number for starting transmission of the data addressed to the terminal UE2 and a sequence number for starting receipt of data from the terminal UE2. In this regard, the source network entity SNE2 detects that the terminal UE2 has started handover by receiving the handover start message.

The terminal UE2 that started handover first sends a random access preamble (Random Access Preamble) as an uplink sync establishment request to the target network entity TNE indicated by the conditional handover command. Synchronized with the target network entity TNE, the terminal UE2 transmits a handover complete (Handover Complete) message to the target network entity TNE. Under the foregoing procedures, handover from the own cell provided by the source network entity SNE2 to the adjacent cell provided by the target network entity TNE takes place.

[Configuration of the Terminal UE2 of the Second Embodiment]

Figure 8:
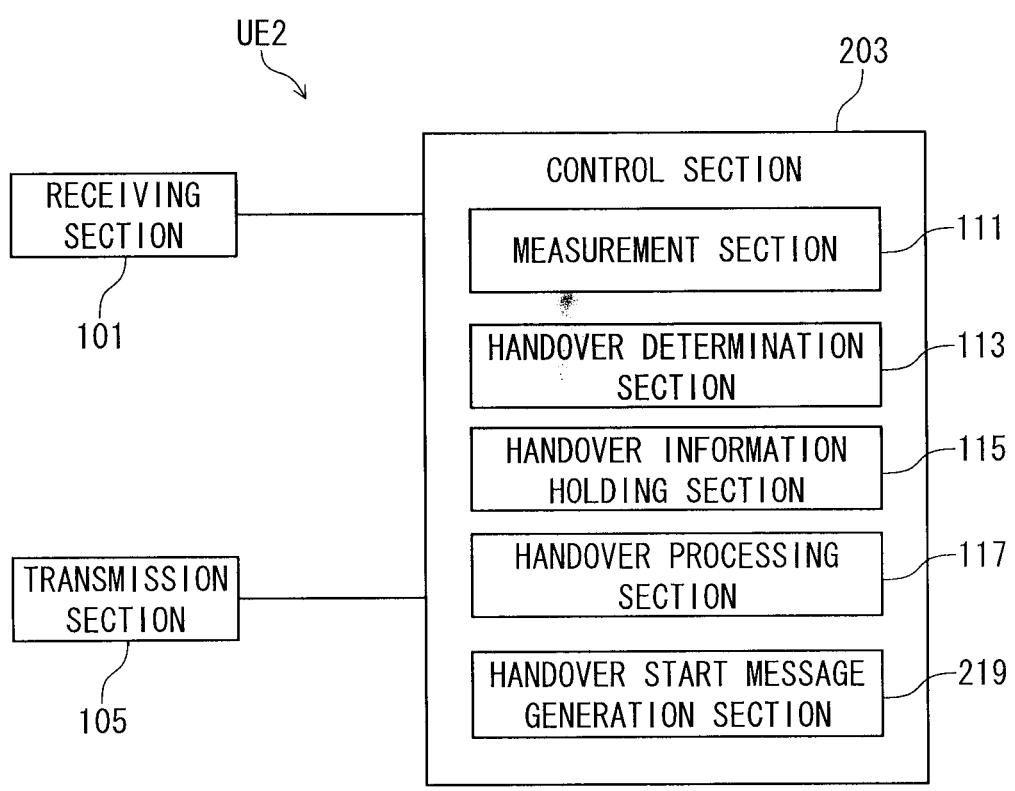
FIG. 8 It is a block diagram of a terminal UE2 that configures the wireless communication system of the second embodiment.

FIG. 8 is a block diagram of the terminal UE2 that configures the wireless communication system of the second embodiment. In FIG. 8, the same reference numerals are given to constituent elements that are common between the terminal UE2 and the terminal UE1 of the first embodiment shown in FIG. 2. As shown in FIG. 8, the terminal UE2 of the second embodiment includes the receiving section 101, a control section 203, and the transmission section 105. The control section 203 has the measurement section 111, the handover determination section 113, the handover information holding section 115, the handover processing section 117, and a handover start message preparation section 219. Since the constituents, except for the handover start message preparation section 219 of the control section 203, are the same as their counterparts described in connection with the first embodiment, their explanations are simplified or omitted.

When the handover determination section 113 determines to start handover, the handover start message preparation section 219 generates a handover start message that reports the start of handover. The handover start message is transmitted from the transmission section 105 to the source network entity SNE2. After preparation of the handover start message, the control section 203 reads information necessary for handover from the handover information holding section 115, outputting the thus-read information to the handover processing section 117. Alternatively, after the receiving section 101 receives an ACK (acknowledgment) signal which is a response to the handover start message from the source network entity SNE2, the control section 203 can also read information necessary for handover from the handover information holding section 115, outputting the thus-read information to the handover processing section 117. Thus, a time margin that will be consumed by the network to prepare for accepting handover of the terminal UE2 (e.g., a time margin required to transfer data addressed to the terminal UE2) can be set up, which will in turn facilitate designing of a wireless communication device, such as a base station.

[Operation of the Terminal UE2 of the Second Embodiment]

Figure 9:
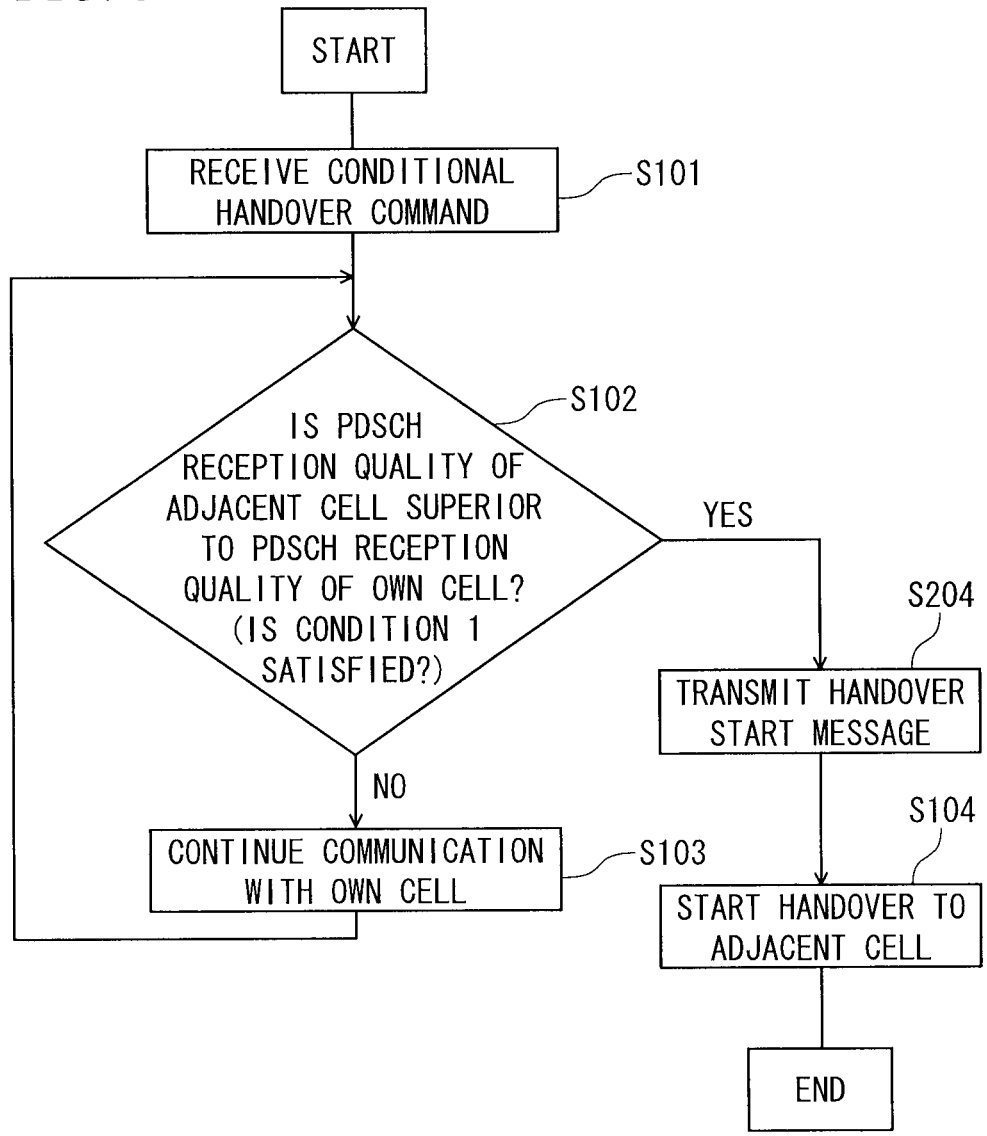
FIG. 9 It is a flowchart showing operation of the terminal UE2 of the second embodiment performed when a predetermined condition is Condition 1.

FIG. 9 is a flowchart showing operation of the terminal UE2 of the second embodiment performed when a predetermined condition is Condition 1. As shown in FIG. 9, the terminal UE2 receives the conditional handover command (step S101). The terminal UE2 determines whether PDSCH reception quality of the target cell for handover is superior to PDSCH reception quality of the own cell (in other words, the PDSCH being currently used) (step S102). When a determination result yielded in step S102 is No, processing proceeds to step S103. In contrast, when the determination result is Yes, processing proceeds to step S204. The terminal UE2 continues the communication with a currently-connected cell in step S103, and processing returns to step S102. In step S204, the terminal UE2 transmits a handover start message in order to notify the source network entity SNE2 of the start of handover. Next, the terminal UE2 halts the communication with the currently-connected cell, starting handover to the target cell for handover (step S104).

When the predetermined condition is Condition 5, the terminal UE2 can halt conditional handover processing after Condition 5 is satisfied and transmit to the source network entity SNE2 a message showing continuation of the communication with the currently-connected cell. In this respect, even when the predetermined condition is any of Conditions 12 to 14, the terminal UE2 can halt the conditional handover processing when the condition is satisfied and transmit to the source network entity SNE2 a message showing continuation of the communication with the currently-connected cell.

[Configuration of the Source Network Entity SNE2 (Source NE2) of the Second Embodiment]

Figure 10:
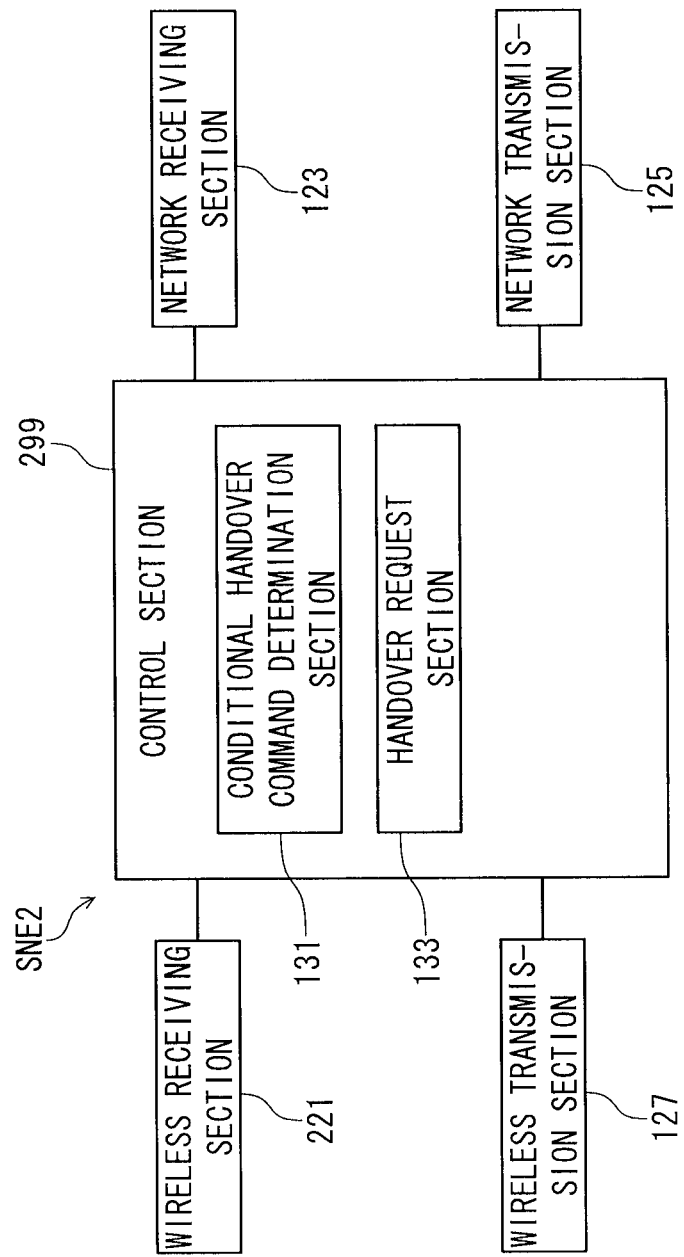
FIG. 10 It is a block diagram of a wireless communication device SNE2 that configures the wireless communication system of the second embodiment.

FIG. 10 is a block diagram of the source network entity SNE2 that configures the wireless communication system of the second embodiment. In FIG. 10, the same reference numerals are given to constituents that are common between the source network entity SNE2 and the source network entity SNE1 of the first embodiment shown in FIG. 5. As shown in FIG. 10, the source network entity SNE2 of the second embodiment includes a wireless receiving section 221, the network receiving section 123, the network transmission section 125, the wireless transmission section 127, and a control section 229. The control section 229 has the conditional handover determination section 131 and the handover request section 133.

The wireless receiving section 221 receives the handover start message transmitted from the terminal UE2, outputting the thus-received message to the control section 229. When the wireless receiving section 221 receives the handover start message, the control section 229 starts transferring the data addressed to the terminal UE2 to the target network entity TNE. In this respect, after receiving the handover start message from the terminal UE2, the source network entity SNE2 can also notify the target network entity TNE that the target network entity TNE should make a reservation for an individual resource for random access.

The target network entity TNE (Target NE) of the second embodiment is also identical with its counterpart target network entity TNE of the first embodiment in terms of a configuration and operation.

In the embodiment, by means of the handover start message transmitted from the terminal to the source network entity that provides the own cell, the source network entity can quickly detect that the terminal starts handover. Subsequently, the source network entity can quickly start processing for transferring the data addressed to the terminal to a target network entity. In addition, so long as the target network entity notifies the source network entity that the terminal will perform handover, the target network entity can obviate a necessity for allocating a resource after the terminal starts handover. Consequently, radio resources of the source network entity can be effectively utilized.

Incidentally, the source network entity that provides the own cell can also use both the method of the first embodiment for detecting that the terminal has started handover and the reception of the handover start message described in connection with the second embodiment. This makes it possible to address even a circumstance in which the terminal starts handover while the source network fails to receive the handover start message because of deterioration of a radio wave environment.

Third Embodiment

By reference to FIG. 11 to FIG. 14, a wireless communication system of a third embodiment is now described. The wireless communication system of the third embodiment differs from the wireless communication system of the first embodiment in that, determining to start handover in the course of the terminal performing conditional handover processing, the source network entity transmits a "handover start command message" to the terminal. The third embodiment is analogous, except for this, to the first embodiment. In FIGS. 11 through 14, constituents or steps that correspond to those described in connection with the first embodiment are assigned the same reference numerals.

Figure 11:
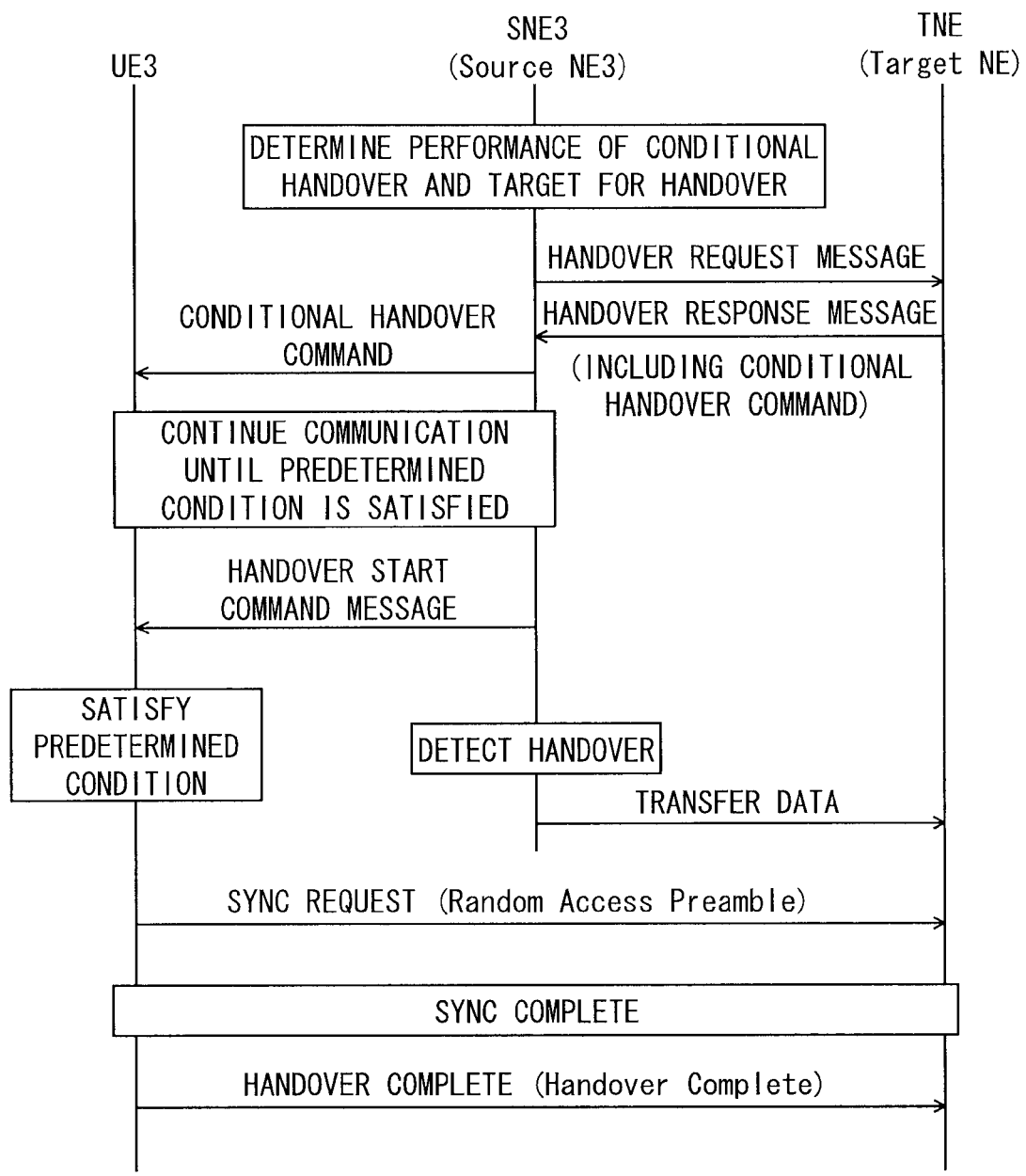
FIG. 11 It is a drawing showing an example timing chart employed when a terminal UE3 performs handover in a wireless communication system of a third embodiment.

FIG. 11 is a drawing showing an example timing chart employed when a terminal UE3 performs handover in a wireless communication system of a third embodiment. As shown in FIG. 11, a source network entity SNE3 that provides an own cell connected to the terminal UE3 receives a measurement result report (Measurement Report) from the terminal UE3, determining performance of conditional handover and a target for handover in the same way as in the first embodiment. Next, the source network entity SNE3 transmits a handover request message to the target network entity TNE. Upon receipt of the handover request message, the target network entity TNE performs handover acknowledgement processing. The target network entity TNE then transmits a handover response message including a conditional handover command to a source network entity SNE 3. The source network entity SNE3 received the handover response message transmits the conditional handover command to the terminal UE3. The conditional handover command includes a predetermined condition necessary for the terminal UE3 to determine handover start timing.

Even having received the conditional handover command, the terminal UE3 does not start handover until a handover start command message which is transmitted from the source network entity SNE3 and will be described later is received or until the predetermined condition described in connection with the first embodiment is satisfied, continuing the communication with the source network entity SNE3. Put another way, receiving the handover start command message or when the predetermined condition is satisfied, the terminal UE3 halts the communication with the source network entity SNE3, starting handover to an adjacent cell that is provided by the target network entity TNE indicated by the conditional handover command. Detecting that the terminal UE3 started handover after transmitting the handover start command message, the source network entity SNE3 starts transferring the data addressed to the terminal UE3 to the target network entity TNE. In addition, the source network entity SNE3 notifies the target network entity TNE of a sequence number (Sequence Number) for starting transmission of the data addressed to the terminal UE3 and a sequence number for receiving the data from the terminal UE3.

By means of transmission of the handover start command message, the source network entity SNE3 detects that the terminal UE3 started handover. Incidentally, the source network entity SNE3 can also use, as a method for detecting that the terminal UE3 has started handover, both the method of the first embodiment and the transmission of the handover start message described in connection with the third embodiment. This enables the source network entity SNE3 to detect handover even when the terminal UE3 started handover as a result of the predetermined condition being satisfied.

The terminal UE1 that started handover first sends a random access preamble (Random Access Preamble) as an uplink sync establishment request to the target network entity TNE indicated by the conditional handover command. Synchronized with the target network entity TNE, the terminal UE3 transmits a handover complete (Handover Complete) message to the target network entity TNE. Under the foregoing procedures, handover from the own cell provided by the source network entity SNE3 to the adjacent cell provided by the target network entity TNE takes place.

[Configuration of the Terminal UE3 of the Third Embodiment]

Figure 12:
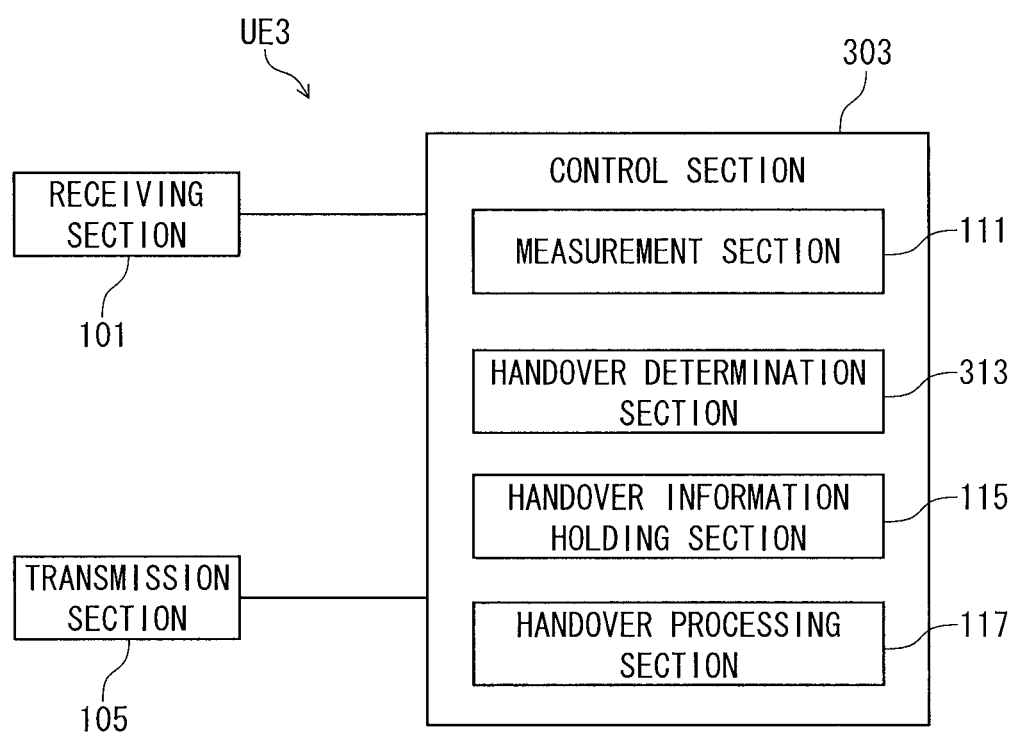
FIG. 12 It is a block diagram of the terminal UE3 that configures the wireless communication system of the third embodiment.

FIG. 12 is a block diagram of the terminal UE3 that configures the wireless communication system of the third embodiment. In FIG. 12, the same reference numerals are given to constituents that are common between the terminal UE3 and the terminal UE1 of the first embodiment shown in FIG. 2. As shown in FIG. 12, the terminal UE3 of the third embodiment includes the receiving section 101, a control section 303, and the transmission section 105. The control section 303 has the measurement section 111, a handover determination section 313, the handover information holding section 115, and the handover processing section 117. Since the constituents, except for the handover determination section 313 of the control section 303, are the same as their counterparts described in connection with the first embodiment, their explanations are simplified or omitted.

The handover determination section 313 requests information, which is necessary to render a determination on the basis of a predetermined condition included in the conditional handover command, from the measurement section 111. The handover determination section 313 determines whether or not to start handover by determining whether or not the information input from the measurement section 111 meets the predetermined condition. Moreover, when the receiving section 101 receives the handover start command message, the handover determination section 313 determines to start handover. Determining to start handover, the handover determination section 313 notifies the control section 203 of the determination.

[Operation of the Terminal UE3 of the Third Embodiment]

Figure 13:
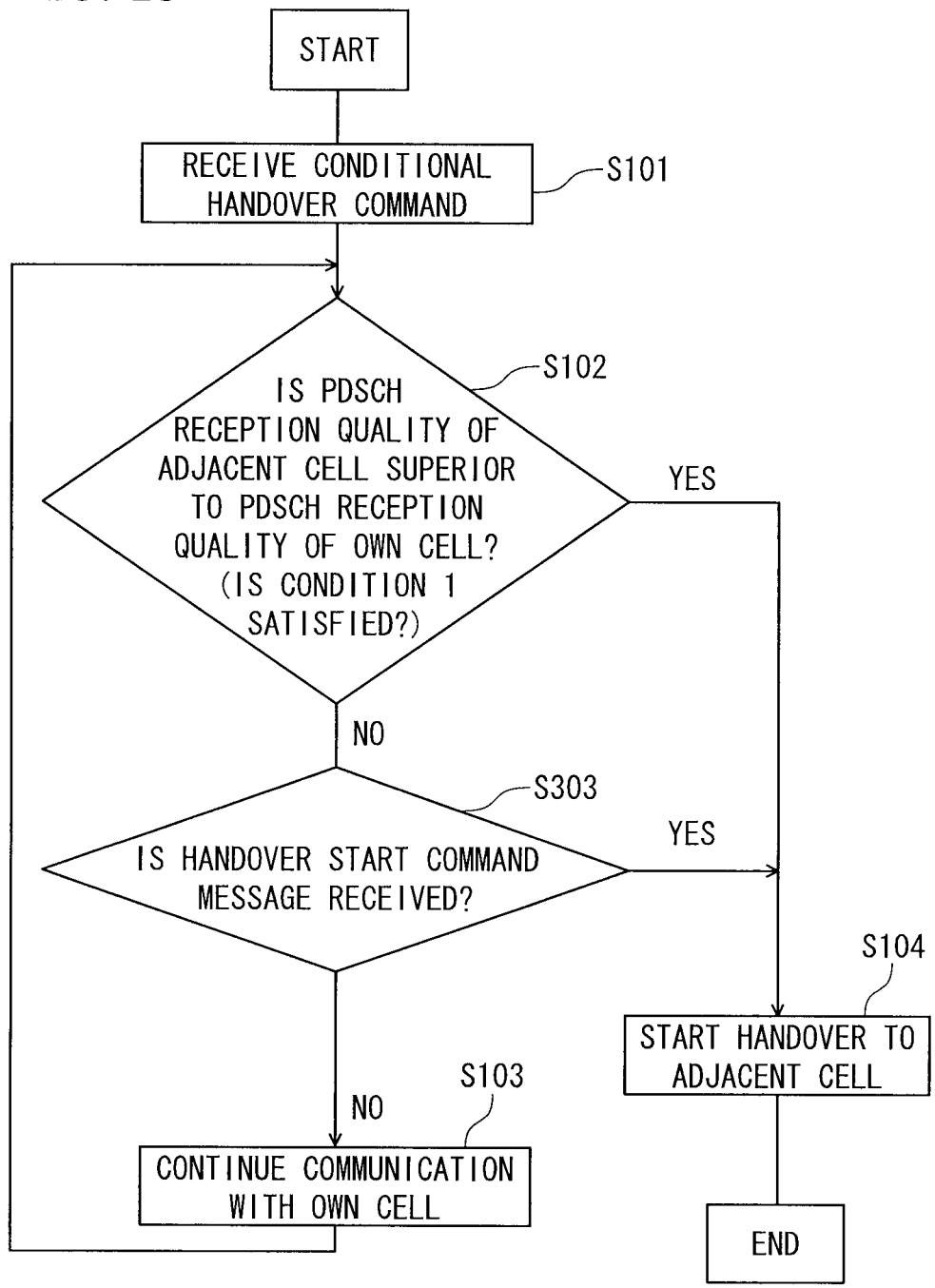
FIG. 13 It is a flowchart showing operation of the terminal UE3 of the third embodiment performed when a predetermined condition is Condition 1.

FIG. 13 is a flowchart showing operation of the terminal UE3 of the third embodiment performed when a predetermined condition is Condition 1. As shown in FIG. 13, the terminal UE3 receives a conditional handover command (step S101). The terminal UE3 determines whether or not PDSCH reception quality of the target cell for handover is superior to PDSCH reception quality of the own cell (i.e., a PDSCH that is in use) (step S102). When a determination result rendered in step S102 is No, processing proceeds to step 3303. In contrast, when the determination result is Yes, processing proceeds to step S104. In step S303, the terminal UE3 determines whether or not the handover start command message is received from the currently-connected cell. When a determination result rendered in step S303 is No, processing proceeds to step S103. By contrast, the determination result is Yes, processing proceeds to step S104. In step S103, the terminal UE3 continues the communication with the currently-connected cell, returning to step S102. In step S104, the terminal UE3 halts the communication with the currently-connected cell, thereupon starting handover to the target cell for handover.

[Configuration of the Source Network Entity SNE3 (Source NE3) of the Third Embodiment]

Figure 14:
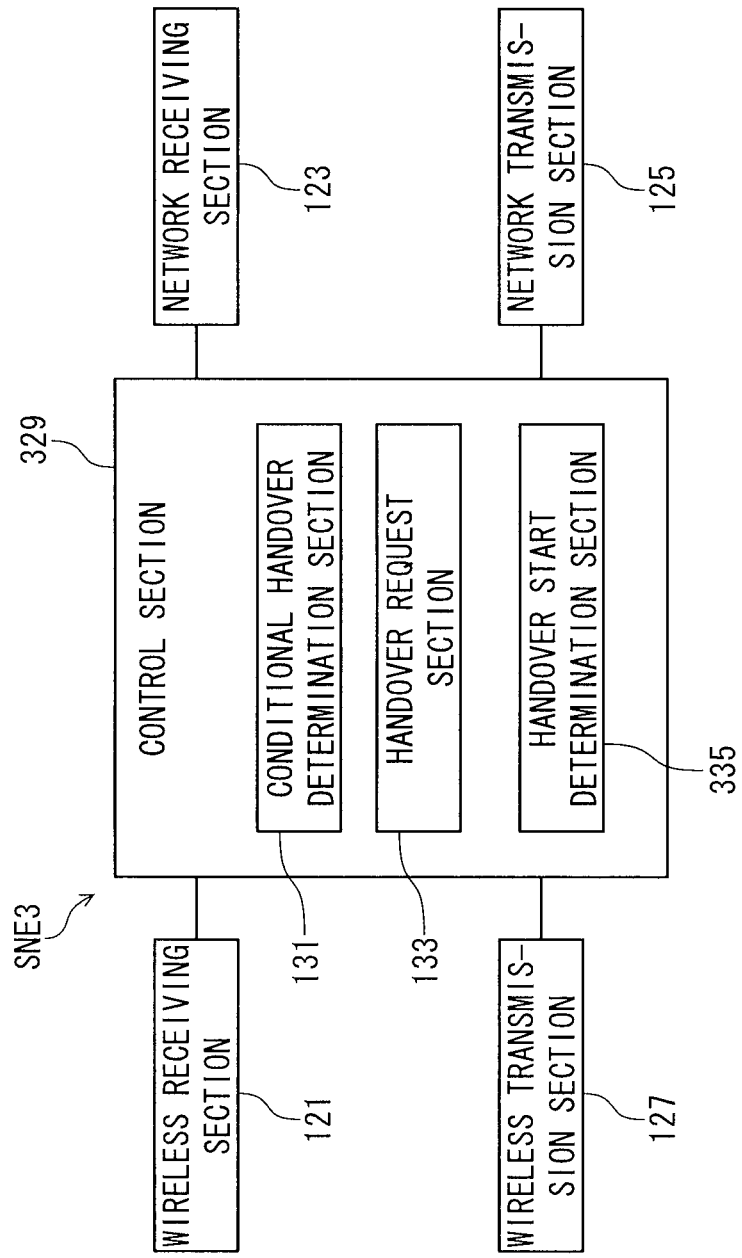
FIG. 14 It is a block diagram of a wireless communication device SNE3 that configures the wireless communication system of the third embodiment.

FIG. 14 is a block diagram of the source network entity SNE3 that configures the wireless communication system of the third embodiment. In FIG. 14, the same reference numerals are given to constituents that are common between the source network entity SNE3 and the source network entity SNE1 of the first embodiment shown in FIG. 5. As shown in FIG. 14, the source network entity SNE3 of the third embodiment includes the wireless receiving section 121, the network receiving section 123, the network transmission section 125, the wireless transmission section 127, and a control section 329. In addition to having the conditional handover determination section 131 and the handover request section 133, the control section 329 has a handover start determination section 335. Since the constituents, except for the handover start determination section 335, are the same as their counterparts described in connection with the first embodiment, their explanations are simplified or omitted.

The handover start determination section 335 determines whether the terminal UE3 should start handover, on the basis of a predetermined condition included in the conditional handover command, a currently-provided environment, or a CSI report or measurement result report received by the wireless receiving section 121. For instance, the handover start determination section 335 infers a difference between PDSCH reception quality and PDCCH reception quality of the own cell from the currently-provided environment or a CSI report; compares the PDSCH reception quality of the own cell with PDSCH reception quality of the adjacent cell on the basis of the measurement result report; and determines whether or not the terminal UE3 starts handover on the basis of the predetermined condition described in connection with the first embodiment. Determining to start handover, the handover start determination section 335 generates a handover start command message. The handover start command message is transmitted from the wireless transmission section 127 to the terminal UE3. When the handover start determination section 335 has generated the handover start command message, the control section 329 starts transferring the data addressed to the terminal UE3 to the target network entity TNE.

According to the embodiment, after receiving the conditional handover command, the terminal can also start handover even under a command from the source network entity that provides the own cell, without relying on timing that is based on a predetermined condition indicated by the conditional handover command.

In the embodiment, the condition for the terminal UE3 to start handover can also be limited to receipt of a handover start command message and Conditions 2, 4, 5, 8, and 9 among Conditions 1 through 11 described in connection with the first embodiment. In this case, however, the terminal UE3 can determine whether or not to start handover under the related-art measurement method, and the source network entity SNE3 can determine handover timing in consideration of a difference between the PDSCH reception quality of the own cell measured by the terminal UE3 and the PDSCH reception quality of the adjacent cell. As above, since the source network entity SNE3 and the terminal UE3 do not make determinations in a duplicated manner under the same condition, appropriate handover timing can be easily determined.

In this regard, the configuration and operation of the embodiment can also be combined with the second embodiment.

Fourth Embodiment

Figure 15:
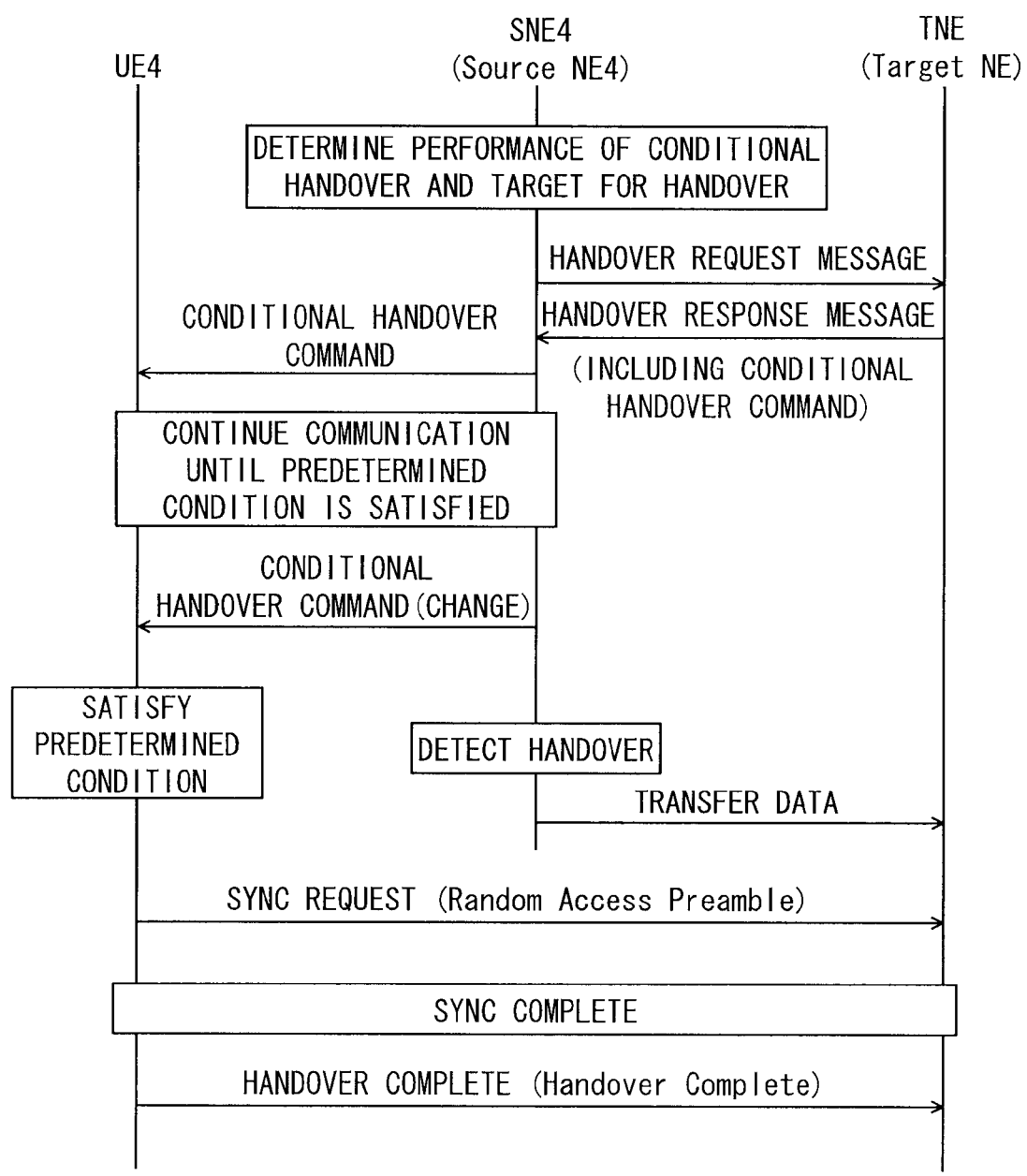
FIG. 15 It is a drawing showing an example timing chart employed when a terminal UE4 performs handover in a wireless communication system of a fourth embodiment.
Figure 16:
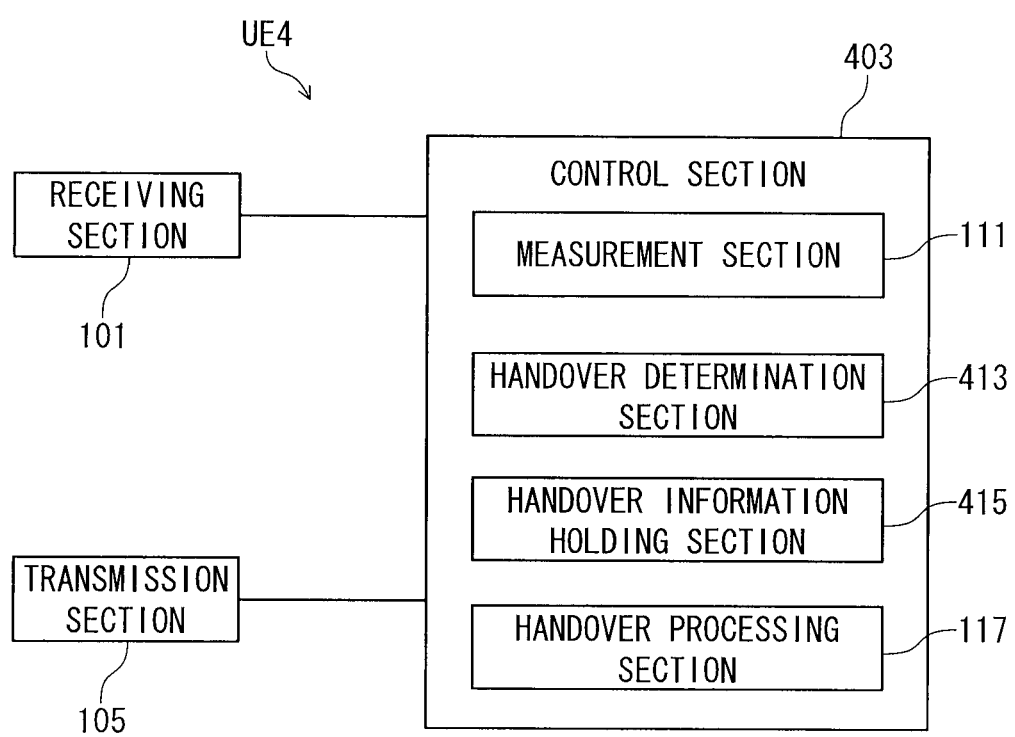
FIG. 16 It is a block diagram of the terminal UE4 that configures the wireless communication system of the fourth embodiment.
Figure 17:
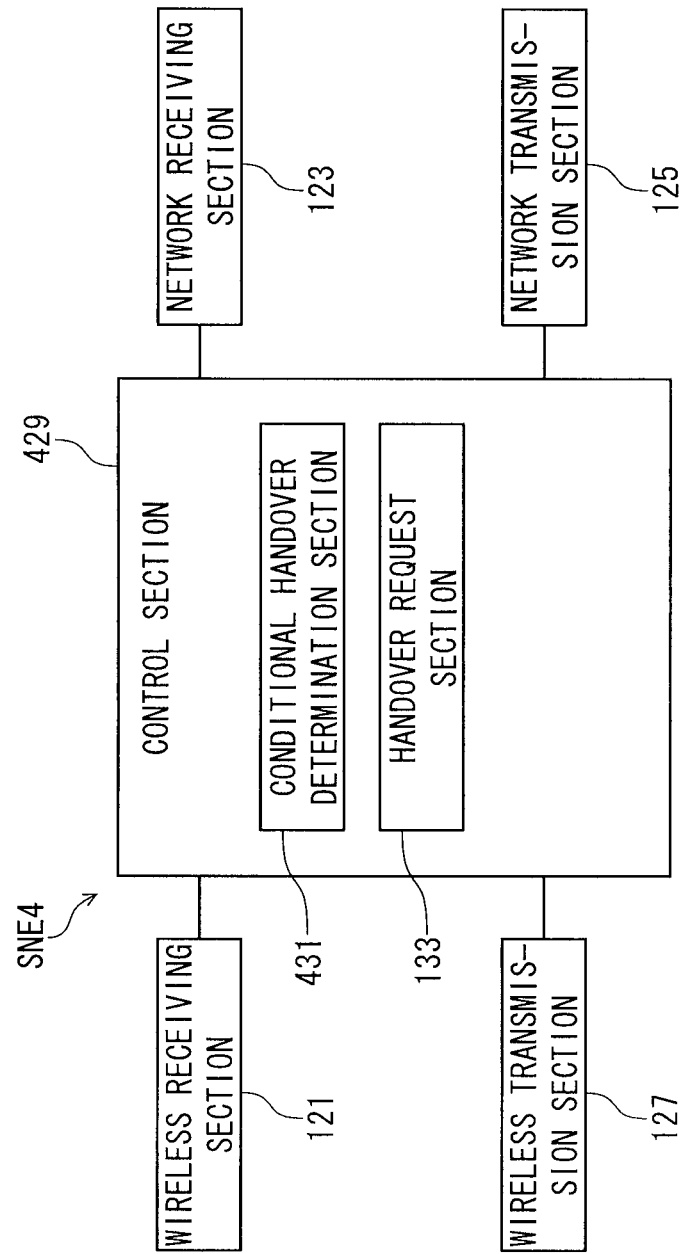
FIG. 17 It is a block diagram of a wireless communication device SNE4 that configures the wireless communication system of the fourth embodiment.

By reference to FIG. 15 to FIG. 17, a wireless communication system of a fourth embodiment is now described. The wireless communication system of the fourth embodiment differs from the wireless communication system of the first embodiment in that specifics of a conditional handover command can be changed after the conditional handover command is transmitted to the terminal. The system is analogous, except for the above, to its counterpart described in connection with the first embodiment, and the same reference numerals are assigned to constituents in FIG. 15 to FIG. 17 that correspond to their counterparts described in connection with the first embodiment.

FIG. 15 is a drawing showing an example timing chart employed when a terminal UE4 performs handover in a wireless communication system of the fourth embodiment. As shown in FIG. 15, a source network entity SNE4 that provides the own cell connected to the terminal UE4 receives a measurement result report (Measurement Report) from the terminal UE4, determining performance of conditional handover and a target for handover. Next, the source network entity SNE4 transmits a handover request message to the target network entity TNE. Upon receipt of the handover request message, the target network entity TNE performs handover acknowledgment processing. The target network entity TNE next transmits a handover response message including the conditional handover command to the source network entity SNE4. The source network entity SNE4 received the handover response message transmits the conditional handover command to the terminal UE4. The conditional handover command includes a predetermined condition that is necessary for the terminal UE4 to determine handover start timing.

Even having received the conditional handover command, the terminal UE4 does not start handover until the predetermined condition described in connection with the first embodiment is satisfied, continuing a communication with the source network entity SNE4. Subsequently, having received the conditional handover command again before the predetermined condition is satisfied, the terminal UE4 changes current processing to processing based on the newly-received conditional handover command. In this regard, if having received the conditional handover command again before the predetermined condition is satisfied, the terminal UE4 can also write the newly-received conditional handover command over the conditional handover command that has already been received. Alternatively, if the source network entity SNE4 sends a command to cancel the conditional handover command before the predetermined condition is satisfied, the terminal UE4 discards (discards) information about the conditional handover command that has already been received.

When the predetermined condition is satisfied, the terminal UE4 halts the communication with the source network entity SNE4, starting handover to an adjacent cell that is provided by the target network entity TNE4 indicated by the conditional handover command. Detecting that the terminal UE4 has started handover by any method, the source network entity SNE4 starts transferring the data addressed to the terminal UE4 to the target network entity TNE. Moreover, the source network entity SNE4 notifies the target network entity TNE of a sequence number (Sequence Number) for starting transmission of the data addressed to the terminal UE4 and a sequence number for receiving the data addressed to the terminal UE4.

The terminal UE4 started handover transmits a random access preamble (Random Access Preamble), as an uplink establishment request, to the target network entity TNE indicated by the conditional handover command. Synchronized with the target network entity TNE4, the terminal UE4 transmits a handover complete message (Handover Complete) to the target network entity TNE. Under the procedures, handover from the own cell provided by the source network entity SNE4 to the adjacent cell provided by the target network entity TNE takes place.

[Configuration of the Terminal of the Fourth Embodiment]

FIG. 16 is a block diagram of the terminal UE4 that configures the wireless communication system of the fourth embodiment. In FIG. 16, the same reference numerals are given to constituent elements that are common between the terminal UE4 and the terminal UE1 of the first embodiment shown in FIG. 2. As shown in FIG. 16, the terminal UE4 of the fourth embodiment includes the receiving section 101, a control section 403, and the transmission section 105. The control section 403 has the measurement section 111, a handover determination section 413, a handover information holding section 415, and the handover processing section 117. Since the constituents, except for the handover determination section 413 and the handover information holding section 415 of the control section 403, are the same as their counterparts described in connection with the first embodiment, their explanations are simplified or omitted.

When the receiving section 101 receives the conditional handover command, the handover determination section 413 ascertains whether or not a predetermined condition used for determining to start handover is already held. When the predetermined condition is already held, the handover determination section 413 determines whether or not a difference exists between a predetermined condition represented by the newly-received conditional handover command and the already-existing predetermined condition. When the difference exists, the handover determination section 413 changes the predetermined condition by incorporating the difference into the already-existing predetermined condition. In this respect, the handover determination section 413 can also write the new predetermined condition over the already-existing predetermined condition. When the predetermined condition is not held, the handover determination section 413 performs operation analogous to that described in connection with the first embodiment by use of the predetermined condition. Incidentally, when the receiving section 101 receives a conditional handover halt message (remove), the handover determination section 413 discards (discard) the already-existing predetermined condition.

When the receiving section 101 receives the conditional handover command, the handover information holding section 415 ascertains whether or not information necessary to perform handover to an adjacent cell is already held. When the information is already held, the handover information holding section 415 determines whether or not a difference exists between the already-existing information and information necessary for handover represented by a new conditional handover command. When the difference exists, the handover information holding section 415 changes the already-existing information by incorporating information about the difference into the already-existing information. In this regard, the newly input information can also be written over the existing information. Incidentally, when the receiving section 101 receives the conditional handover halt message (remove), the handover information holding section 415 discards (discard) the already-existing information necessary for handover.

[Configuration of the Source Network Entity SNE4 (Source NE4) of the Fourth Embodiment]

FIG. 17 is a block diagram of the source network entity SNE4 that configures the wireless communication system of the fourth embodiment. In FIG. 17, the same reference numerals are given to constituent elements that are common between the source network entity SNE4 and the source network entity SNE1 of the first embodiment shown in FIG. 5. As shown in FIG. 17, the source network entity SNE4 of the fourth embodiment includes the wireless receiving section 121, the network receiving section 123, the network transmission section 125, the wireless transmission section 127, and a control section 429. The control section 429 has a conditional handover determination section 431 and the handover request section 133. Since the constituents, except for the conditional handover determination section 431 of the control section 429, are the same as their counterparts described in connection with the first embodiment, their explanations are simplified or omitted.

The conditional handover determination section 431 determines from the CSI report or the measurement result report from the terminal UE4 whether or not to change the conditional handover command. Determining that a change should be made to the target for handover, the conditional handover determination section 431 outputs to the handover request section the fact that handover is conditional and information about the target cell for handover. In addition, the conditional handover determination section 431 determines from the CSI report or the measurement result report of the terminal UE4 whether or not to halt the conditional handover command transmitted to the UE4. Determining to halt the conditional handover command, the conditional handover command 431 outputs a message to this effect to the control section 429.

When the network receiving section 123 receives the handover response message, the control section 429 determines whether or not the conditional handover command includes a change. Determining that the conditional handover command includes a change, the control section 429 updates the target cell for data transfer in accordance with a newly-input conditional handover command. Upon receipt of an input stating halting of the conditional handover command from the conditional handover determination section 431, the control section 429 generates a conditional handover halt message, outputting the message to the wireless transmission section 127. On occasion of the changing or halting of the conditional handover command, the control section 429 can also output to the network transmission section 125 a message for notifying an already-set target cell for handover of the changing or halting of the conditional handover command.

According to the embodiment, it is possible to change the target for handover or cancel handover in accordance with movement of the terminal, whereby a connection with a cell which is more preferable for the terminal can be maintained.

The configuration and operation of the embodiment can also be combined with the second embodiment or the third embodiment.

The embodiments have been described while the coordinated multiple-point transmission/reception (Coordinated Multiple Point: CoMP) technique is employed by way of explanation. However, the disclosure can be applied to a circumstance in which a difference exists between the coverage of PDCCH reception quality and the coverage of PDSCH reception quality. For instance, the disclosure can be applied to a heterogeneous network (Heterogeneous Network) environment. A macrocell may, for instance, apply an ABS (Almost Blank Subframe) that is a subframe for not transmitting a signal or transmitting a signal at low power to a specific subframe. As a result of application of the disclosure, a terminal that uses a picocell located within a coverage of the microcell can prolong a time during which the terminal remains connected to the picocell. Off-loading between a microcell and a picocell can thereby be maximized. Moreover, for instance, the disclosure can be applied to a wireless communication system in which wireless communication devices differ from each other in terms of the number of antennas. For example, when a terminal connected to a wireless communication device that operates by use of four antennas hands over a communication to a wireless communication device that operates by use of two antennas, the connection can be maintained longer by means of the wireless communication device with four antennas. The terminal can thereby exhibit a high throughput.

Although each of the embodiments has been described by taking, as an example, a circumstance in which the disclosure is configured in hardware, the disclosure can also be implemented by means of software in collaboration with hardware.

Each of the functional blocks used in explaining the respective embodiments is embodied by an LSI that is typically an integrated circuit. The functional blocks can also be individually embodied as a single chip, or some or all of the functional blocks can also be implemented as a single chip. Although the LSI is used as an integrated circuit here, the circuit can also be referred to as an IC, a system LSI, a super LSI, and an ultra LSI according to an integrity level.

A circuit integration technique is not restricted to the LSI and also be implemented by a custom-designed circuit or a general-purpose processor. There can also be utilized an FPGA (Field Programmable Gate Array) that can be programmed after fabrication of an LSI and a reconfigurable processor that enables reconfiguration of connections and settings of circuit cells in an LSI.

Further, if advancement of semiconductor technology or other technology deriving from the semiconductor technology results in the advent of a circuit integration technique which replaces the LSI technology, the functional blocks can naturally be integrated by use of the technique. Application of biotechnology, or the like, is probable.

Although the embodiments have been described by adoption of the antenna, an antenna port can also be applied to the embodiments in the same way. The word "Antenna Port" used here denotes a logic antenna that is configured of one or a plurality of physical antennas. Specifically, the antenna port is not always limited to one physical antenna but may refer to an arrayed antenna which is configured of a plurality of antennas, and the like. For instance, the LTE (Long Term Evolution) standard has no regulation about the number of physical antennas used for the antenna port, and the antenna port is merely laid down as a minimum unit by means of which a base station can transmit different reference signals (Reference signals). Moreover, the antenna port can sometimes be stipulated as a minimum unit that performs weighted multiplication of precoding vectors (Precoding vectors).

Although this disclosure is described in detail with reference to specific embodiments, it is apparent that various modifications and amendments may be made by those skilled in the art without departing from the spirit and scope of the disclosure.

This patent application is based on Japanese Patent Application (No. 2011-176975) filed on Aug. 12, 2011, the entire contents of which are incorporated herein by reference.

INDUSTRIAL APPLICABILITY

Even when signal reception quality of a data channel of an own cell differs from signal reception quality of a control channel of the own cell, a wireless communication terminal of the disclosure is useful as a wireless communication terminal, or the like, that performs handover to an adjacent cell in an appropriate circumstance.

REFERENCE SIGNS LIST

UE1, UE2, UE3, UE4 TERMINAL
101 RECEIVING SECTION
103, 203, 303, 403 CONTROL SECTION
105 TRANSMISSION SECTION
111 MEASUREMENT SECTION
113, 313, 413 HANDOVER DETERMINATION SECTION
115, 415 HANDOVER INFORMATION HOLDING SECTION
117 HANDOVER PROCESSING SECTION
219 HANDOVER START MESSAGE PREPARATION SECTION
SNE1, SNE2, SNE3, SNE4 SOURCE NETWORK ENTITY
121, 221 WIRELESS RECEIVING SECTION
123 NETWORK RECEIVING SECTION
125 NETWORK TRANSMISSION SECTION
127 WIRELESS TRANSMISSION SECTION
129, 229, 329, 429 CONTROL SECTION
131, 431 CONDITIONAL HANDOVER DETERMINATION SECTION

133 HANDOVER REQUEST SECTION
335 HANDOVER START DETERMINATION SECTION
TNE TARGET NETWORK ENTITY
141 WIRELESS RECEIVING SECTION
143 NETWORK RECEIVING SECTION
145 NETWORK TRANSMISSION SECTION
147 WIRELESS TRANSMISSION SECTION
149 CONTROL SECTION
151 CONDITIONAL HANDOVER COMMAND GENERATION SECTION

The invention claimed is:

1. A handover control method that is carried out by a wireless communication terminal which performs a communication with a wireless communication device by use of a control channel and a data channel, the method comprising:
receiving a cell-specific reference signal transmitted from the wireless communication device on a per-cell basis;
based on the cell-specific reference signal, generating a measurement result report that differentiates between a control channel signal reception quality of an own cell provided by the wireless communication device connected to the wireless communication terminal and a data channel signal reception quality of the own cell;
transmitting the measurement result report to the wireless communication device that provides the own cell for determining performance of a conditional handover and a target for handover;
receiving a conditional handover command that has been transmitted from the wireless communication device which provides the own cell based on the measurement result report and that gives a command to start handover to an adjacent cell when a predetermined condition is satisfied;
determining whether or not the predetermined condition is satisfied by comparing the data channel signal reception quality of the own cell with a data channel signal reception quality of the adjacent cell; and
starting handover to the adjacent cell indicated by the conditional handover command when the predetermined condition is satisfied.

2. The handover control method according to claim 1, wherein the predetermined condition is that the data channel signal reception quality of the adjacent cell measured by the wireless communication terminal is superior to the data channel signal reception quality of the own cell measured by the wireless communication terminal.

3. The handover control method according to claim 1, wherein the predetermined condition is that the control channel signal reception quality of the own cell measured by the wireless communication terminal is lower than a predetermined threshold value.

4. The handover control method according to claim 1, wherein the predetermined condition is that the data channel signal reception quality of the adjacent cell measured by the wireless communication terminal is superior to the data channel signal reception quality of the own cell measured by the wireless communication terminal or that the control channel signal reception quality of the own cell is lower than a predetermined threshold value.

5. The handover control method according to claim 2, wherein the predetermined condition selectively includes a case where a time which has elapsed since the conditional handover command was received reaches a limit time indicated by the conditional handover command.

6. The handover control method according to claim 1, wherein the own cell is provided by a plurality of wireless communication devices.

7. The handover control method according to claim 1, wherein
the own cell is provided by a plurality of wireless communication devices;
the wireless communication terminal is connected to a wireless communication device which configures a small cell among the plurality of wireless communication devices; and
the adjacent cell is a macrocell that is larger than the small cell in terms of a coverage area.

8. The handover control method according to claim 1, wherein antennas provided in the wireless communication device that provides the own cell are larger in number than antennas provided in a wireless communication device that provides the adjacent cell.

9. The handover control method according to claim 1, wherein a message showing that handover to the adjacent cell is started is transmitted to the wireless communication device that provides the own cell when the predetermined condition is satisfied.

10. The handover control method according to claim 1, wherein, when a message which gives a command to start handover is received from the wireless communication device that provides the own cell before the predetermined condition is satisfied, handover to the adjacent cell indicated by the conditional handover command is started.

11. The handover control method according to claim 1, further comprising:
receiving a new conditional handover command that indicates a condition which differs from the predetermined condition or handover to a different adjacent cell;
determining whether or not a condition indicated by the new conditional handover command is satisfied; and
starting handover to the adjacent cell indicated by the new conditional handover command when the condition indicated by the new conditional handover command is satisfied.

12. A wireless communication terminal that performs a communication with a wireless communication device by use of a control channel and a data channel, the wireless communication terminal comprising one or more integrated circuits configured to:
receive a cell-specific reference signal transmitted from the wireless communication device on a per-cell basis;
based on the cell-specific reference signal, generate a measurement result report that differentiates between a control channel signal reception quality of an own cell provided by the wireless communication device connected to the wireless communication terminal and a data channel signal reception quality of the own cell;
transmit the measurement result report to the wireless communication device that provides the own cell for determining performance of a conditional handover and a target for handover;
receive a conditional handover command transmitted from the wireless communication device which provides the own cell based on the measurement result report and that gives a command to start handover to an adjacent cell when a predetermined condition is satisfied;
determine whether or not the predetermined condition is satisfied by comparing the data channel signal reception quality of the own cell with a data channel signal reception quality of the adjacent cell; and start handover to the adjacent cell indicated by the conditional handover command when the predetermined condition is satisfied.

13. The wireless communication terminal according to claim 12, wherein the predetermined condition is that the data channel signal reception quality of the adjacent cell measured by the wireless communication terminal is superior to the data channel signal reception quality of the own cell measured by the wireless communication terminal.

14. The wireless communication terminal according to claim 12, wherein the predetermined condition is that the control channel signal reception quality of the own cell measured by the wireless communication terminal is lower than a predetermined threshold value.

15. The wireless communication terminal according to claim 12, wherein the predetermined condition is that the data channel signal reception quality of the adjacent cell measured by the wireless communication terminal is superior to the data channel signal reception quality of the own cell measured by the wireless communication terminal or that the control channel signal reception quality of the own cell is lower than a predetermined threshold value.

16. The wireless communication terminal according to claim 13, wherein the predetermined condition selectively includes a case where a time which has elapsed since the conditional handover command was received reaches a limit time indicated by the conditional handover command.

17. The wireless communication terminal according to claim 12, wherein the own cell is provided by a plurality of wireless communication devices.

18. The wireless communication terminal according to claim 12, wherein
the own cell is provided by a plurality of wireless communication devices;
the wireless communication terminal is connected to a wireless communication device which configures a small cell among the plurality of wireless communication devices; and
the adjacent cell is a macrocell that is larger than the small cell in terms of a coverage area.

19. The wireless communication terminal according to claim 12, wherein antennas provided in the wireless communication device that provides the own cell are larger in number than antennas provided in a wireless communication device that provides the adjacent cell.

20. The wireless communication terminal according to claim 12, wherein a message showing that handover to the adjacent cell is started is transmitted to the wireless communication device that provides the own cell when the predetermined condition is satisfied.

21. The wireless communication terminal according to claim 12, wherein, when a message commanding to start handover is received from the wireless communication device that provides the own cell before the predetermined condition is satisfied, handover to the adjacent cell indicated by the conditional handover command is started.

22. The wireless communication terminal according to claim 12, further configured to:
receive a new conditional handover command that shows a condition which differs from the predetermined condition or handover to a different adjacent cell;
determine whether or not a condition indicated by the new conditional handover command is satisfied; and
start handover to the adjacent cell indicated by the new conditional handover command when the condition indicated by the new conditional handover command is satisfied.

23. A wireless communication device that performs a communication with a wireless communication terminal by use of a control channel and a data channel and that provides an own cell connected to the wireless communication terminal, the wireless communication device comprising one or more integrated circuits configured to:
transmit a cell-specific reference signal to the wireless communication terminal on a per-cell basis;
determine an adjacent cell, which is a target for handover of the wireless communication terminal, based on a measurement result report, based on the cell-specific reference signal, that differentiates between a control channel signal reception quality of the own cell and a data channel signal reception quality of the own cell transmitted from the wireless communication terminal or an environment which the wireless communication device provides to the wireless communication terminal and select, as handover to be performed by the wireless communication terminal, conditional handover which gives a command for starting handover to the adjacent cell when a predetermined condition is satisfied or condition-free handover;
transmit to the wireless communication terminal a conditional handover command which starts handover to the adjacent cell when the predetermined condition is satisfied; and
on detecting that the wireless communication terminal has started handover, transfer data addressed to the wireless communication terminal to a wireless communication device which provides the adjacent cell,
wherein the determination of whether or not the predetermined condition is satisfied is made by comparing the data channel signal reception quality of the own cell with a data channel signal reception quality of the adjacent cell.

24. The wireless communication device according to claim 23, further comprising one or more integrated circuits configured to receive a message which is transmitted from the wireless communication terminal and which shows that the wireless communication terminal starts handover.

25. The wireless communication device according to claim 23, further comprising one or more integrated circuits configured to generate a message for commanding the wireless communication terminal which has transmitted the conditional handover command to start handover before the predetermined condition is satisfied, wherein
the generated message is transmitted to the wireless communication terminal.

26. The wireless communication device according to claim 23, wherein, when a change is made to specifics of a determination of the adjacent cell or when a change is made to the predetermined condition, transmitting the conditional handover command reflecting specifics of the change to the wireless communication terminal.

27. A wireless communication device that is capable of practicing a communication with a wireless communication terminal by use of a control channel and a data channel and that provides a cell adjacent to an own cell connected to the wireless communication terminal, the wireless communication device comprising one or more integrated circuits configured to:
transmit a cell-specific reference signal to the wireless communication terminal on a per-cell basis;

receive a handover request message based on a measurement result report, based on the cell-specific reference signal, that differentiates between a control channel signal reception quality of the own cell and a data channel signal reception quality of the own cell, said handover request message being transmitted from a wireless communication device that provides the own cell;

generate, based on the handover request message, either a conditional handover command for commanding to start handover to an adjacent cell when a predetermined condition is satisfied or a condition-free handover command; and transmit to the wireless communication device which provides the own cell a handover response message including the generated conditional handover command or the generated condition-free handover command, wherein the predetermined condition is determined based on an environment provided to the wireless communication terminal when generating the conditional handover command, and by comparing the data channel signal reception quality of the own cell with a data channel signal reception quality of the adjacent cell.

* * * * *